(12) United States Patent
Paranjpe et al.

(10) Patent No.: US 11,860,982 B2
(45) Date of Patent: Jan. 2, 2024

(54) PEER TO PEER (P2P) ENCRYPTED DATA TRANSFER/OFFLOAD SYSTEM AND METHOD

(71) Applicant: MARGO NETWORKS PVT. LTD., Mumbai (IN)

(72) Inventors: Rohit Paranjpe, Mumbai (IN); Ripunjay Bararia, Mumbai (IN)

(73) Assignee: MARGO NETWORKS PVT. LTD.

( * ) Notice: Subject to any disclaimer, the term of this patent is extended or adjusted under 35 U.S.C. 154(b) by 0 days.

(21) Appl. No.: 18/116,723

(22) Filed: Mar. 2, 2023

(65) Prior Publication Data

US 2023/0376573 A1    Nov. 23, 2023

(30) Foreign Application Priority Data

May 18, 2022   (IN) .............................. 202221028558

(51) Int. Cl.
G06F 21/10      (2013.01)
H04L 9/40       (2022.01)

(52) U.S. Cl.
CPC ........ G06F 21/105 (2013.01); H04L 63/0428 (2013.01); *G06F 2221/0788* (2013.01)

(58) Field of Classification Search
None
See application file for complete search history.

(56) References Cited

U.S. PATENT DOCUMENTS

| | | | |
|---|---|---|---|
| 7,127,713 B2 | 10/2006 | Davis | |
| 7,307,956 B2 | 12/2007 | Kaplan et al. | |
| 7,395,355 B2 | 7/2008 | Afergan et al. | |
| 7,505,944 B2 | 3/2009 | Moulart et al. | |
| 7,752,258 B2 | 7/2010 | Lewin et al. | |
| 7,860,950 B2 | 12/2010 | Menon et al. | |
| 7,891,007 B2 | 2/2011 | Waxman et al. | |
| 7,921,259 B2 | 4/2011 | Elazary et al. | |
| 8,359,473 B1 | 1/2013 | Sorotokin et al. | |
| 8,365,301 B2 | 1/2013 | Miller | |
| 8,375,456 B2 | 2/2013 | Li et al. | |
| 8,407,472 B2 | 3/2013 | Hao et al. | |
| 8,516,529 B2 | 8/2013 | LaJoie et al. | |
| 8,737,357 B2 | 5/2014 | Denny et al. | |
| 8,746,553 B2 | 6/2014 | Burdett | |
| 8,838,480 B2 | 9/2014 | Damola et al. | |
| 8,843,758 B2 | 9/2014 | Dharmarajan et al. | |
| 8,868,678 B2 | 10/2014 | Hildreth et al. | |
| 8,937,903 B2 | 1/2015 | Bari et al. | |
| 9,001,682 B2 | 4/2015 | Kovvali et al. | |

(Continued)

FOREIGN PATENT DOCUMENTS

| | | |
|---|---|---|
| CN | 101741869 B | 4/2013 |
| CN | 103782571 A | 5/2014 |

(Continued)

OTHER PUBLICATIONS

US 8,782,123 B2, 07/2014, Seed et al. (withdrawn)

(Continued)

*Primary Examiner* — Brandon Hoffman
(74) *Attorney, Agent, or Firm* — Manatt, Phelps & Phillips, LLP

(57) ABSTRACT

A peer to peer (P2P) system and method for sharing encrypted digital content may be used in a content delivery network system.

15 Claims, 12 Drawing Sheets

(56) References Cited

U.S. PATENT DOCUMENTS

| | | |
|---|---|---|
| 9,003,436 B2 | 4/2015 | Tidwell et al. |
| 9,021,106 B2 | 4/2015 | Manion et al. |
| 9,105,021 B2 | 8/2015 | Tobin |
| 9,110,902 B1 | 8/2015 | Dorwin |
| 9,118,462 B2 | 8/2015 | Khambete |
| 9,173,158 B2 | 10/2015 | Varma |
| 9,197,696 B1 | 11/2015 | Jakatdar et al. |
| 9,213,809 B2 | 12/2015 | Lindquist et al. |
| 9,282,352 B2 | 3/2016 | McDysan et al. |
| 9,367,857 B2 | 6/2016 | Linden et al. |
| 9,374,619 B2 | 6/2016 | Andreasen et al. |
| 9,419,845 B2 | 8/2016 | Wainner et al. |
| 9,497,496 B1 | 11/2016 | Corley et al. |
| 9,565,117 B2 | 2/2017 | Dahod et al. |
| 9,584,598 B2 | 2/2017 | Phillips et al. |
| 9,613,190 B2 | 4/2017 | Ford et al. |
| 9,661,374 B1 | 5/2017 | Erdmann et al. |
| 9,674,239 B2 | 6/2017 | Wong et al. |
| 9,697,366 B1 | 7/2017 | Dorwin et al. |
| 9,871,850 B1 | 1/2018 | Brandwine et al. |
| 9,875,493 B2 | 1/2018 | Nuzzi |
| 9,904,934 B1 | 2/2018 | Kumar et al. |
| 9,911,154 B2 | 3/2018 | Baker et al. |
| 10,009,741 B1 | 6/2018 | Burcham et al. |
| 10,019,724 B2 | 7/2018 | Patel |
| 10,045,070 B2 | 8/2018 | Markley et al. |
| 10,049,349 B1 | 8/2018 | Grassadonia et al. |
| 10,055,721 B1 | 8/2018 | Mocko et al. |
| 10,085,063 B2 | 9/2018 | Hainline |
| 10,097,503 B2 | 10/2018 | Bergman |
| 10,110,710 B2 | 10/2018 | Cook et al. |
| 10,134,026 B1 | 11/2018 | Koeppel |
| 10,142,444 B2 | 11/2018 | Reynolds et al. |
| 10,200,480 B2 | 2/2019 | Zhang et al. |
| 10,248,975 B2 | 4/2019 | Garcia-Martinez et al. |
| 10,298,402 B2 | 5/2019 | Isles et al. |
| 10,447,659 B2 | 10/2019 | Roberts-Hoffman et al. |
| 10,470,060 B1 | 11/2019 | Paranjpe et al. |
| 10,496,979 B2 | 12/2019 | Taveau et al. |
| 10,554,748 B2 | 2/2020 | Sivasubramanian et al. |
| 10,572,634 B2 | 2/2020 | Chowdhury et al. |
| 10,630,769 B2 | 4/2020 | Carver et al. |
| 10,693,813 B1 | 6/2020 | Jacob Da Silva et al. |
| 10,715,411 B1 | 7/2020 | Jacob Da Silva et al. |
| 10,878,404 B2 | 12/2020 | Lu et al. |
| 10,931,778 B2 | 2/2021 | Paranjpe et al. |
| 2001/0023180 A1 | 9/2001 | Sauer |
| 2002/0023002 A1 | 2/2002 | Staehelin |
| 2002/0143798 A1 | 10/2002 | Lisiecki et al. |
| 2002/0194171 A1 | 12/2002 | Judd et al. |
| 2004/0093419 A1 | 5/2004 | Weihl et al. |
| 2004/0205162 A1 | 10/2004 | Parikh |
| 2004/0232221 A1 | 11/2004 | Beenau |
| 2005/0021462 A1 | 1/2005 | Teague et al. |
| 2005/0027543 A1 | 2/2005 | Labrou |
| 2005/0177624 A1 | 8/2005 | Oswald et al. |
| 2006/0036493 A1 | 2/2006 | Aufricht et al. |
| 2006/0242069 A1* | 10/2006 | Peterka .................. G06F 21/10 705/50 |
| 2007/0094691 A1 | 4/2007 | Gazdzinski |
| 2007/0106626 A1 | 5/2007 | Mundie et al. |
| 2007/0124662 A1 | 5/2007 | Streuter et al. |
| 2007/0226365 A1* | 9/2007 | Hildreth ............... G11B 27/034 375/E7.198 |
| 2007/0255617 A1 | 11/2007 | Maurone et al. |
| 2008/0010192 A1 | 1/2008 | Rackley, III |
| 2008/0049630 A1 | 2/2008 | Kozisek et al. |
| 2008/0102947 A1 | 5/2008 | Hays et al. |
| 2008/0103977 A1 | 5/2008 | Khosravy et al. |
| 2008/0162589 A1 | 7/2008 | Rodeheffer et al. |
| 2008/0107264 A1 | 8/2008 | Van Wie et al. |
| 2008/0215747 A1 | 9/2008 | Menon et al. |
| 2008/0222281 A1 | 9/2008 | Dilley et al. |
| 2008/0262941 A1 | 10/2008 | Feiner |
| 2009/0030765 A1 | 1/2009 | Cameron et al. |
| 2009/0094160 A1 | 4/2009 | Webster et al. |
| 2009/0132365 A1 | 5/2009 | Gruenhagen et al. |
| 2009/0132395 A1 | 5/2009 | Lam et al. |
| 2009/0157537 A1 | 6/2009 | Miller |
| 2009/0164286 A1 | 6/2009 | Gupta et al. |
| 2009/0164329 A1 | 6/2009 | Bishop |
| 2009/0164330 A1 | 6/2009 | Bishop |
| 2009/0254661 A1 | 10/2009 | Fullagar et al. |
| 2009/0287515 A1 | 11/2009 | Mehta et al. |
| 2009/0323693 A1 | 12/2009 | Yin et al. |
| 2010/0074267 A1 | 3/2010 | Ladd |
| 2010/0121715 A1 | 5/2010 | Shiojinna |
| 2011/0078079 A1 | 3/2011 | Shin |
| 2011/0082724 A1 | 4/2011 | Le Chevalier et al. |
| 2011/0087602 A1 | 4/2011 | Rutman |
| 2011/0161462 A1 | 6/2011 | Hussain et al. |
| 2011/0314145 A1 | 12/2011 | Raleigh et al. |
| 2012/0054837 A1 | 3/2012 | Yoon |
| 2012/0072995 A1 | 3/2012 | Crawford |
| 2012/0096106 A1 | 4/2012 | Blumofe et al. |
| 2012/0166618 A1 | 6/2012 | Dahod et al. |
| 2012/0215915 A1 | 8/2012 | Sakata et al. |
| 2012/0231844 A1 | 9/2012 | Coppinger |
| 2012/0330769 A1 | 12/2012 | Arceo |
| 2013/0013688 A1 | 1/2013 | Wang et al. |
| 2013/0024363 A1 | 1/2013 | Cunescu et al. |
| 2013/0085864 A1 | 4/2013 | Ahmed et al. |
| 2013/0107732 A1 | 5/2013 | O'Donnell et al. |
| 2013/0110984 A1 | 5/2013 | Raciborski et al. |
| 2013/0132504 A1 | 5/2013 | Kohli et al. |
| 2013/0238503 A1 | 9/2013 | Patel |
| 2013/0346305 A1 | 12/2013 | Mendes |
| 2014/0082126 A1 | 3/2014 | Kim et al. |
| 2014/0094159 A1 | 4/2014 | Raleigh et al. |
| 2014/0095320 A1 | 4/2014 | Sivarannakrishnan et al. |
| 2014/0101781 A1 | 4/2014 | Bouknight |
| 2014/0115606 A1 | 4/2014 | Hamzata et al. |
| 2014/0229277 A1 | 8/2014 | Khambete et al. |
| 2014/0279047 A1 | 9/2014 | Wang et al. |
| 2014/0282725 A1 | 9/2014 | Brandstetter |
| 2014/0373049 A1 | 12/2014 | Carr et al. |
| 2015/0143397 A1 | 5/2015 | Bies |
| 2015/0172135 A1 | 6/2015 | Coppola et al. |
| 2015/0237512 A1 | 8/2015 | Chang et al. |
| 2015/0278796 A1 | 10/2015 | Jiang et al. |
| 2015/0302181 A1* | 10/2015 | Fahn .................. G06F 16/40 726/26 |
| 2015/0310421 A1 | 10/2015 | Xie |
| 2015/0339318 A1 | 11/2015 | O'Toole et al. |
| 2015/0339667 A1 | 11/2015 | Dua |
| 2015/0341705 A1 | 11/2015 | Rauhe et al. |
| 2015/0350018 A1 | 12/2015 | Hui et al. |
| 2015/0371215 A1 | 12/2015 | Zhou |
| 2016/0034876 A1 | 2/2016 | Speiser |
| 2016/0042344 A1 | 2/2016 | Thimmana et al. |
| 2016/0011718 A1 | 4/2016 | Jajara |
| 2016/0191651 A1 | 6/2016 | Balakrishnan et al. |
| 2016/0210622 A1 | 7/2016 | Yang et al. |
| 2016/0248879 A1 | 8/2016 | Fliam et al. |
| 2016/0300272 A1 | 10/2016 | Ao et al. |
| 2016/0328740 A1 | 11/2016 | Chan et al. |
| 2016/0337206 A1 | 11/2016 | Bugenhagen et al. |
| 2016/0371716 A1 | 12/2016 | Aitenbichler |
| 2017/0032345 A1 | 2/2017 | Gideon et al. |
| 2017/0142024 A1 | 5/2017 | Fromentoux et al. |
| 2017/0155739 A1 | 6/2017 | Ao |
| 2017/0178090 A1 | 6/2017 | Sarin |
| 2017/0187837 A1 | 6/2017 | Ao |
| 2017/0223029 A1 | 8/2017 | Sharma et al. |
| 2017/0228766 A1 | 8/2017 | Mahajan |
| 2017/0255924 A1 | 9/2017 | White |
| 2017/0262902 A1 | 9/2017 | Weston et al. |
| 2018/0068290 A1 | 3/2018 | Xia |
| 2018/0068293 A1 | 3/2018 | Dunne |
| 2018/0077258 A1 | 3/2018 | Newton et al. |
| 2018/0124143 A1 | 5/2018 | Bologh |
| 2018/0124646 A1 | 5/2018 | Thubert et al. |
| 2018/0184132 A1 | 6/2018 | Mao |
| 2018/0184477 A1 | 6/2018 | Paredes et al. |

(56) References Cited

U.S. PATENT DOCUMENTS

| | | | |
|---|---|---|---|
| 2018/0232732 A1 | 8/2018 | Rodrigues et al. | |
| 2018/0310279 A1 | 10/2018 | Pathak et al. | |
| 2018/0317067 A1 | 11/2018 | Ameixieira | |
| 2018/0352279 A1 | 12/2018 | Chow et al. | |
| 2019/0028743 A1 | 1/2019 | He et al. | |
| 2019/0069003 A1 | 2/2019 | Panagos et al. | |
| 2019/0114631 A1 | 4/2019 | Madhu et al. | |
| 2019/0122202 A1 | 4/2019 | Sun | |
| 2019/0130386 A1 | 5/2019 | Bhat | |
| 2019/0139029 A1 | 5/2019 | Kadiwala | |
| 2019/0141561 A1 | 5/2019 | Altay et al. | |
| 2019/0166395 A1 | 5/2019 | Li | |
| 2019/0197539 A1 | 6/2019 | Chang | |
| 2019/0268392 A1 | 8/2019 | Santangelo et al. | |
| 2019/0274082 A1 | 9/2019 | Vemuri et al. | |
| 2019/0289059 A1 | 9/2019 | Vanahalli et al. | |
| 2020/0034172 A1 | 1/2020 | Wu et al. | |
| 2020/0082404 A1 | 3/2020 | Zhang et al. | |
| 2020/0126062 A1 | 4/2020 | Sun | |
| 2020/0153932 A1 | 5/2020 | Bao et al. | |
| 2020/0167742 A1 | 5/2020 | Zhai et al. | |
| 2020/0167746 A1 | 5/2020 | Yu et al. | |
| 2020/0220942 A1 | 7/2020 | Paranjpe et al. | |
| 2020/0221365 A1 | 7/2020 | Paranjpe et al. | |
| 2020/0242616 A1 | 7/2020 | Waughtal | |
| 2020/0242626 A1 | 7/2020 | Agarwal et al. | |
| 2020/0250644 A1 | 8/2020 | Oberholtzer | |
| 2021/0065174 A1 | 3/2021 | Singh | |
| 2021/0097521 A1 | 4/2021 | Kumar | |
| 2021/0103910 A1 | 4/2021 | Subramaniam | |
| 2021/0243072 A1 | 8/2021 | Peterson | |
| 2021/0289039 A1 | 9/2021 | Paranjpe et al. | |
| 2022/0020016 A1 | 1/2022 | Scott | |
| 2022/0224594 A1 | 7/2022 | Peterson | |

FOREIGN PATENT DOCUMENTS

| | | |
|---|---|---|
| CN | 106790552 A | 5/2017 |
| CN | 107852609 A | 3/2018 |
| CN | 107645475 B | 12/2019 |
| EP | 2815541 A1 | 12/2014 |
| EP | 3 557 843 A1 | 10/2019 |
| IN | 201921000982 A | 1/2020 |
| IN | 2019210008950 | 10/2020 |
| KR | 100572478 B1 | 12/2006 |
| KR | 20070067005 A | 6/2007 |
| KR | 20130102792 A | 9/2013 |
| KR | 101574074 B1 | 12/2015 |
| WO | WO2006133655 A1 | 12/2006 |
| WO | WO2008022339 A2 | 2/2008 |
| WO | WO2009101600 A1 | 8/2009 |
| WO | WO2012000438 A1 | 1/2012 |
| WO | WO2012131287 A1 | 10/2012 |
| WO | WO2013052028 A2 | 4/2013 |
| WO | WO2013123162 A1 | 8/2013 |
| WO | WO2013170864 A1 | 11/2013 |
| WO | WO2015090360 A1 | 6/2015 |
| WO | WO2015181591 | 12/2015 |
| WO | WO2016043839 A1 | 3/2016 |
| WO | WO2018027984 A1 | 2/2018 |
| WO | WO2018158729 A1 | 4/2018 |
| WO | WO2018087275 A1 | 5/2018 |
| WO | WO2018215681 A1 | 11/2018 |
| WO | WO2019123273 A1 | 6/2019 |
| WO | WO2020144701 A1 | 7/2020 |

OTHER PUBLICATIONS

Bhardwaj et al., "AppFlux: Taming App Delivery Streaming," Georgia Institute of Technology, pp. 1-14, Oct. 2015.
Kalva et al."Techniques for Improving the Capacity of Video-on Demand Systems," Proceeds of 29th Annual Hawaii International Conference on System Sciences, 1996, pp. 309-315.
Lai et al., "A Hierarchical Network Storage Architecture for Video-on-Demand Services," IEEE Transactions on Broadcasting, vol. 43:2, (Jun. 1997), pp. 145-154.
Little, T.D.C. et al., "Prospects for Interactive Video-on-Demand," Multimedia Communications Laboratory, MCL Technical Report, (Feb. 15, 1994), pp. 1-22.
"How to Auto Switch between WiFi and Mobile the Smart Way," (Dec. 2018), 6 pages, Speedicyhttps://speedify.com/blog.
Kos et al., "CATV Broadband Technologies, EC-VIP-MC 2003, 4th EURASIP Conference," (2003), pp. 829-834.
Alloush et al., "Initial use cases, scenarios and requirements," CogNet, (Nov. 30, 2015), Ver. 0.9, pp. 1-107.
Velasco et al., "A Service-Oriented Hybrid Access Network and Cloud Architecture," pp. 8.
Bulander et al., "Comparison of Different Approaches for Mobile Advertising," The Second IEEE International Workshop on Mobile Commerce and Services (WMCS '05) Jul. 19, 2005, Munich, Germany, IEEE Computer Society, pp. 174-182, 10 pages.
Callejo et al., "Opportunities and Challenges of Ad-based Measurements from the Edge of the Network," © 2017 Association for Computing Machinery. ACM ISBN 978-1-4503-5569-8/17/11, Dec. 1, 2017, Palo Alto, CA, USA © 2017 Association for Computing Machinery. ACM ISBN 978-1-4503-5569-8/17/11, 7 pages. https://doi.org/10.1145/3152434.3152895.
Khan et al., "CAMEO:A Middleware for Mobile Advertisement Delivery," Network Architecture and Design]:Wireless Communication, Research performed by author as a Research Fellow at Singapore Management University, Jun. 25-28, 2013, 13 pages.
Toubiana et al., "Adnostic: Privacy Preserving Targeted Advertising," NYU.edu and stanford.edu, supported by the NSF Portia and Muri Presidio projects, 23 pages, Mar. 2010.
Adi et al., "Secured Multi-Identity Mobile Infrastructure and Offline Mobile-Assisted Micro-Payment Application," WCNC 2004 / IEEE Communications Society, 4 pages.
Kiran et al., "Building Robust m-Commerce Payment System on Offline Wireless Network,"Dept of Electronics & Communication Eng. Sai Vidya Institute of Technology and Electronics & Communication Eng. UVCE, 3 pages, 2011.
Van Damme et al., "Offline NFC Payments with Electronic Vouchers," Dept. Electrical Engineering-ESAT/SCD/IBBT-COSIC, Katholieke Universiteit Leuven, Kasteelpark Arenberg 10, 3001 Heverlee-Leuven, Belgium, MobiHeld'09, Aug. 17, 2009, Barcelona, Spain, 6 pages.
Wikipedia, the Free Encyclopedia, Distributed Computing, Internet Archive WayBack Machine Capture date of Dec. 10, 2013, Internet Archive WayBack Machine (Year: 2013), 11 pages.
Mu, Su. "Application networking for pervasive content delivery." (2008). https://core.ac.uk/download/pdf/48630854.pdf. Disclosing CDN Components with a Network (Fig 2.2, p. 16 with Section "2.4.1 Open Pluggable Edge Service" from pp. 26-28).
Frangoudis,"An architecture for on-demand service deployment, over a telco CDN," IEEE ICC 2016 Next-Gen IRISA/University of Rennes 1, France, Aalto University, Finland, 6 pgs.
Frangoudis et al. "CDN-as-a-Service Provision over a Telecom Operator's Cloud," IEEE Transactions on Network and Service Management, IEEE, Dec. 9, 2017, 4(3), pp. 702-716, 16 pgs.
Griwodz et al. "Content Distribution Infrastructures," Jul. 2, 2004, Dagstuhl Seminar Proceedings 04201 http://drops.dagstuhl.de/opus/volltexte/2006/502, 6 pgs.
Hamzeh et al. "Residential Network Architectures and Services," Cable Networks, Services, and Management, 1st Edition, 2015 Edited by Mehmet Toy, 372 pgs.
Huang, Shufeng, "A HyperNet Architecture" (2014), Theses and Dissertations—Computer Science. 18., https://uknowledge.uky.edu/cs_etds/18, 165 pgs.
Ravindran, "A Management Framework for Service Personalization," 2002, SOMA Networks Dept. of Electrical and Computer Engineering, Ryerson University, Toronto, Canada, 13 pgs.
Tyson, "A Topology Aware Clustering Mechanism" 2007, Computing Department Lancaster University, 6 pages.
Yala, "QoE-Aware Computing Resource Allocation for CDN-as-a-Service Provision" Irisa/University of Rennes 1, France, Eurecom Institute, Sophia Antipolis, France, 2016, 6 pgs.

(56) References Cited

OTHER PUBLICATIONS

Egorov, et al., "NuCypher KMS: Decentralized key management system" NuCypher and NICS Lab, Universidad de Malaga, Spain, Nov. 15, 2017, 21 pages.
Agile I.T., "Azure Rights Management" webpage, https://www.agileit.com/azure-rights-management/, 9 pages.
Arkko, et al., "MIKEY: Multimedia Internet KEYing", Network Working Group, Ericsson Research, Aug. 2004, 66 pages.

* cited by examiner

PEER TO PEER (P2P) ENCRYPTED DATA TRANSFER/OFFLOAD SYSTEM AND METHOD

PRIORITY CLAIM

This application claims priority under the Paris Convention and 35 USC 119 to Indian Patent Application Serial No. 202221028558 filed May 18, 2022, that is incorporated herein by reference.

FIELD

The disclosure relates generally to peer to peer (P2P) systems and in particular to a P2P system for encrypted data.

BACKGROUND

Peer-to-Peer (P2P) file-sharing is the mechanism adopted by file-sharing apps to enable people to share files among themselves, at little or no cost. The file sharing mechanism, while simple and cost-effective, does not provide a way to share licensed files between peers in a secure and legal manner. At present, although several digital rights management (DRM) technologies are available, there is no DRM solution that allows secure sharing of licensed files from one device to another in a pure peer-to-peer (P2P) scenario. The reason for not having such a solution may be attributed to the fear of unfettered distribution of DRM-protected content. However, incidences of illegal transfer of licensed or copyright-protected files keep surfacing from time to time.

FIG. 1 illustrates a typical content distribution model and system in which the process of streaming on-demand video can be classified into the following three phases: 1) storing the content; 2) multiplexing the content by making the data adaptable to make it suitable for reproduction under varied conditions, which can happen at different points even before storage; and 3) distributing the content by ensuring the video gets from where it is to where it's going to be played. Digital advertisement providers, metadata tracking tools, licensing software and other niche-specific services can be plugged in at basically any point of the value chain, making room for almost infinite verticalization.

These current content distribution systems do have a mechanism for distribution of encrypted/secured content using a digital rights management (DRM) system. Currently, all DRM technologies use a mechanism for license generation, which is served from the cloud. The logic for the distribution of DRM-protected content is closely monitored by a central authority, which hinders scalability. If the license server or designated authority is down or unreachable, a user cannot transfer a protected piece of content from one endpoint (PC, media device, service, etc.) to another which is problematic. The DRM technologies have protection policies. Though necessary, these protection policies complicate the matter since device-specific licensing, multi-use restrictions, etc. prevent users from sharing content among legitimate consumers of the same service(s).

Today, when a user wishes to play any content, such as a song or a video, which is protected by DRM, the user client has to involve a central licensing authority (CLA) to issue or validate the license for rendering the content on multiple devices. The CLA may be the content owner or an independent third party. Its intervention is required for the DRM content to be successfully shared across devices. For instance, if a user wishes to transfer or access a song from Device A to Device B, a CLA has to interface with Device B to issue an appropriate license or validate the existing one for playing the content.

Peer to Peer (P2P) content distribution for encrypted data uses smarter mathematical models to make an individual license work for multiple devices, file formats, and platforms. Technologies for peer-to-peer data exchange over networks have been in existence virtually since the beginning of computer networking in the 1980s. Nowadays, in its most generic form, the term peer-to-peer is used to distinguish a network architecture from client-server, which has been a dominant architecture in both pre-Internet network applications and on the Internet itself. The idea of client-server is that resources (such as files) are on a server computer, and clients can only obtain resources through servers. For instance, if client C1 wants to fetch resource R from client C2, then it needs to go through a server to do so, thereby, requiring the server to have a list of resources that includes resource R and C2 as its location. In a server-based architecture, the more demand for a file, the more bandwidth cost it entails. In a peer to peer (P2P) system, the more a file is requested, the more nodes are seeding it, lowering the delivery cost per-file distributed. The role of the audience in the equation for P2P is inverted.

Although P2P on the Internet did not come into being until 1999, IP owners had been long concerned with digital networks being the conduits for unauthorized file copying. Most industry-observers identify the year 1994, as the year when digital rights management began to emerge as a field of its own. Though the early contributors to the DRM field did not necessarily envision the Internet to be as dominant a force as it has become now, 1994 can still be regarded as the year that saw the beginning of the commercialization of the Internet. IP owners in the mid-1990s saw online rights management as an effort toward replication of the business model of the offline world. As a crude example, the "rights management" properties of a printed book result directly from its physical characteristics, e.g., it is difficult to copy books in their entirety and virtually impossible to change their contents in place. Publishers sought technologies that would bring similar behavior to the online digital world. Early DRM solutions, such as IBM's Cryptolope and EPR's (later InterTrust's) DigiBox, attempted to provide that behavior. Just as P2P is an Internet application of pre-existing network architectures, DRM technology is really an extension of techniques that had long been used in operating systems to control users' access to system resources.

There are different types of DRM implementations, but all of them conform to a common architecture as shown in FIG. 2. In this architecture, the user receives an encrypted file containing the content, along with a license that specifies the rights the user has over the content. A piece of software or hardware on the user's client device interprets the license and, if successfully authenticated, decrypts the content, and does what the user intends (play, view, print, copy, etc.). Variations on the canonical DRM architecture involve such issues as: whether the authorization is done based on a user's identity, a device's identity, or both; whether the software doing the authorization is built-in to the playback device or software, built-in to the platform on which it runs, or independent of those; whether the license is bundled-in with or separate from the content; how much fine-grained control the IP owner has over the specification of rights; whether or not the user is required to be connected to the network at all times; and how financial transactions are integrated with the authorization process.

IP owners have been using DRM to implement new business models, which are not just analogs of existing offline models. Such models represent the brightest future for online content distribution. However, they have only been modestly successful, because it takes a lot of time and effort to get users comfortable with new ways of consuming content. As a result, DRM is starting to take off as a component of online content models in niche markets, such as the online music distribution of Apple's iTunes, RealNetworks's Rhapsody, and Napster 2.0; eBooks and ePeriodicals from various publishers; and online film download services like MovieLink and Cinemallow.

DRM has had a hard time developing as a market, for several reasons. Online replication of offline business models has been rough from the perspective of user convenience. There is also an ingrained notion about consumer behavior (and, some feel in legal precedents as well) that people should be allowed to do what they wish with digital content, without the fear of being controlled or monitored. DRM technology can monitor and control. At the same time, the networked digital paradigm has introduced the concept of "do what you wish" to allow rampant, unrestricted, perfect copying; IP owners need to be able to control that. Therefore, DRM continues to develop toward giving users convenient, seamless experiences along with guarantees of privacy.

There has recently been an explosion of mobile data as shown in FIG. 3. In India, there will be 907.4 million total Internet users (64% of the population) by 2023, up from 398.2 million (29% of the population) in 2018, there will be 966.4 million total mobile users (68% of the population) by 2023, up from 763.1 million (56% of population) in 2018 and the population will be 1.42 billion by 2023, up from 1.34 billion in 2018. Devices/Connections per capita went from 0.8 in 2018 to 1.0 in 2023. The average broadband speeds went from 4.6 Mbps in 2018 to 16.3 Mbps in 2023.

Latency refers to the delay users experience, measured in millliseconds, as data makes a round trip through a network. LTE Networks can operate with a latency up to 10 ms even on the 1800 MHz spectrum, which is widely accepted as a standard across global telecom operators. Nonetheless, due to network congestion, the latency is 4-7 times higher than optimal, across countries. Globally, the average latency across even 4G networks has not crossed the sub-30 milliseconds milestone. The most recent statistics for average global latency stands at 40 ms, while the average latency in developing nations is far worse. India ranks 131 in global mobile internet speed ranking behind countries like Syria, Kenya and Angola and India has latency of 52 milliseconds v/s global average of 37 milliseconds. Close to 90% of the rural internet population and 60% of Urban internet users in India face network issues like high load time, poor signal and delay in receiving information. The use cases of a railway network or a metro/bus or an airplane where you will have unreliable connectivity also forms a use case where such a solution will enable support. During the COVID-19 pandemic, a mobile experience report suggests that the average deterioration of Internet speed was pegged at an average of 15-20% across 42 countries that the survey was carried out across, during the period March 2020-May 2020. According to Cisco forecasts and practical experiences of mobile operators, the world is facing the "mobile data apocalypse" in which cellular networks do not, yet, have enough capacity to serve for such an exponential growth of data.

Mobile data needs reasonable DRM usage support. The term "fair use" is a loaded one; it has a specific meaning under U.S. copyright law (its analog in the U.K., Canada, and Australia is "fair dealing"). Consumer advocates and others have extended the meaning to include few other reasonable usage expectations. The legal term refers to usage of content that are valid defenses to charges of copyright infringement. Users must conform to broad legal guidelines, but ultimately a judge and jury decides on whether the usage is fair. Therefore, it is impossible to create an automated system to proactively decide whether to allow usage based on the legal fair-use criteria. "Reasonable usage expectation" is subjective. If a user buys a piece of content, he/she may well expect the content to be rendered (display, play, or print) on any device that he/she owns.

The global market for Digital Rights Management (DRM) that is estimated at US$3.3 billion in the year 2020, is projected to reach a revised size of US$8.2 Billion by 2027—growing at a CAGR of 13.7% over the analysis period 2020-2027. The media and entertainment DRM, one of the segments analyzed in the report, is projected to record a 14.6% CAGR to reach US$5.5 billion by the end of the analysis period. After an early analysis of the business implications of the pandemic and its induced economic crisis, growth in the enterprise DRM segment is readjusted to a revised 12.9% CAGR for the next 7-year period. In the global Software DRM segment, USA, Canada, Japan, China, and Europe will drive the 10.4% CAGR estimated for this segment. These regional markets that account for a combined market size of US$465.5 million in the year 2020, will reach a projected size of US$930.5 million by the end of the analysis period. China will remain among the fastest growing in this cluster of regional markets. Led by countries, such as Australia, India, and South Korea, the market in Asia-Pacific is forecasted to reach US$1.2 billion by the year 2027, while Latin America will expand at a 12.7% CAGR through the analysis period.

DRM systems should be able to support a user's reasonable content usage expectations; this should include acting independently of individual formats and playback software or devices, and facilitating any necessarily format conversions or transcoding. In addition, the DRM solution should be able to serve the user requirement in an under-connected or unconnected environment. As we said above that 70% of India's internet users face problems with connectivity and experience delays and latency it becomes very important to have capability to generate DRM at the user interface without having to transfer the DRM using the internet. This capability of self-generated DRM in an under-connected or unconnected environment will enable users to view the content piece without having to worry about the connectivity issues.

Need for Lightweight DRM Protected Content Super-Distribution

At 1.5 trillion, the Indian media and entertainment sector is one of the largest industries in the world, but continues to battle a serious piracy problem with $2.8 billion of its annual revenue lost due to piracy. P2P piracy is still prominent around the globe and plays a central role in distributing content to the online piracy ecosystem. The high-quality video content in greatest demand on piracy sites is first released on the P2P network. In fact, web video sites source a significant proportion (28%) of their high-quality movie and TV video content from P2P sites. Irdeto tracked more than 800 million monthly downloads between January 2017 and May 2018 through its P2P Business Intelligence tracker. This is where global activity for more than 400 popular movie and TV titles is monitored. March 2018 was the peak in activity when nearly 977 million infringing copies of movies and TV shows were downloaded globally from P2P sites. Like the case for live streaming, the US again leads the world in the number of users accessing illegal content, with some significant differences in the countries also ranked high on P2P piracy.

The top five countries for P2P downloads between January 2017 and May 2018 are as follows: USA—1.71 billion; RUSSIA—1.64 billion; BRAZIL—1.17 billion; INDIA—965 million and NETHERLANDS—636 million. Demand for high quality video content drives P2P piracy, and India accounts for 60% of piracy visits via P2P sites, the report said. India also ranked fourth in downloading Blu-ray files (171 million), surpassing China (50.8 million) and catching up with the US (180 million). Superdistribution has been mentioned in the same breath as DRM since the early days of DRM, when a few DRM technology vendors attempted to support it. The Superdistribution scheme to make its own economic offers is prohibitive. For example, one peer may want to sell content items individually at a profit, while another may want to sell them at cost, another may want to loan them, and yet another may want to make a repository of items available on a monthly subscription basis. The nearest that most DRM schemes have gotten to "Superdistribution" is a URL included in encrypted files that takes users who are not authorized to access the content to a website where they can purchase rights. This is inadequate and the peers should be able to define their own business models.

Consumers are willing to pay for content that meets their needs. Given the sheer volume of music, video, and other digital media being generated, securing download rights is a challenge, even for large providers. If services can deliver high-quality streaming content on demand, data shows that consumers are willing to pay—the OTT video streaming service market is predicted to reach $30 billion by 2020. Catering to such an audience and providing them with reasonable modes of Content Pricing will be the need of the hour.

Although known to computer scientists and networking professionals for decades, peer-to-peer (P2P) systems only became widely popular in the late 1990s with the Napster case and, then, with the U.S. Court's decision in MGM v. Grokster in 2005. P2P has been seen as a bane of the content industry due to copyright infringements and consequential revenue losses.

Napster Example—Throughout the 80s and 90s, the client-server model flourished as the power of CPUs available to consumers was still small (albeit rising). Most file transfers happened over landline telephone, with FTP and USENET gaining usage along the period, and the IRC being invented in 88. In the late 90s, new data compression technologies (MP3, MPEG) came into mainstream use and were probably the last straw. This Internet zeitgeist began shifting back to peer to peer (see FIG. 4) with the introduction of Napster. Users downloaded a free program from a computer over the internet that searched the local disks of neighboring computers for MP3 files, and were able to download these MP3 files directly from one another. In less than one year, Napster had over a million members. In less than two, Metallica filed a lawsuit against the company. In less than three (July 2001), it was shut down after legal suffocation and a failed attempt to become a pay-based service.

Gnutella Example—Gnutella is a large P2P network as shown in FIG. 5. Other networks adapted this model since it was first of its kind. Peers have the same capability and responsibility. Nodes communicate in a symmetric manner in this type of network. Lack of a central directory server index allows metadata of shared files to be stored locally among all peers. As shown in FIG. 5, each user acts independently and nodes communicate with each other through the use of queries.

Bit-Torrent example—Bit Torrent appeared in 2005 as an application layer network protocol used to distribute files. Nodes here can download and upload a file at the same time. This does not necessarily mean that a node finishes its download before uploading. Complete downloaded blocks can be uploaded to other nodes on the network. The serving capacity increases as the number of downloads increase making the system self-scaling. Client-server architecture is also adapted here as nodes contact the server to locate other nodes that they may connect to.

A torrent file must first be acquired for one to begin a download. The torrent files are found on the web and contain information about the files that are contained in the torrent, the location—address/hostname of the torrent's tracker. The tracker is a computer, which acts as a server, and maintains a list of nodes that are participating in the system (i.e. computers that are currently downloading or uploading file data).

Once a computer has established a connection to one other node in the system, it can begin downloading data. Faster download occurs based on the increased number of node connections, hence the likelihood of obtaining a complete copy of the file. A typical Bit-Torrent system needs to have at least one seeder that has a complete copy of the data being shared. When a copy has been uploaded by the seeder to other nodes, the seeder may leave the network. However, for successful ongoing data-sharing, at least one complete copy must remain available across the nodes in the network. Plenty of research and practice has shown that the above systems are scalable and efficient for Internet content distribution. However, existing systems are mostly used for distributing non-copyright protected digital objects or pirated goods. They are not leveraged to distribute the majority of legal media objects because the current BT protocol does not provide copyright protection mechanisms. These known systems that has a technical problem in that none of these systems have a technical mechanism/DRM system to address the sharing of DRM digital content.

Thus, it is desirable to provide a P2P encrypted data transfer system that utilizes the peer to peer architecture with DRM to provide encrypted data transfer. The P2P encrypted data transfer system provide legal digital content P2P sharing and overcomes the technical problems of the known system above and it is to this end that the disclosure is directed.

DETAILED DESCRIPTION OF ONE OR MORE EMBODIMENTS

Figure 1:
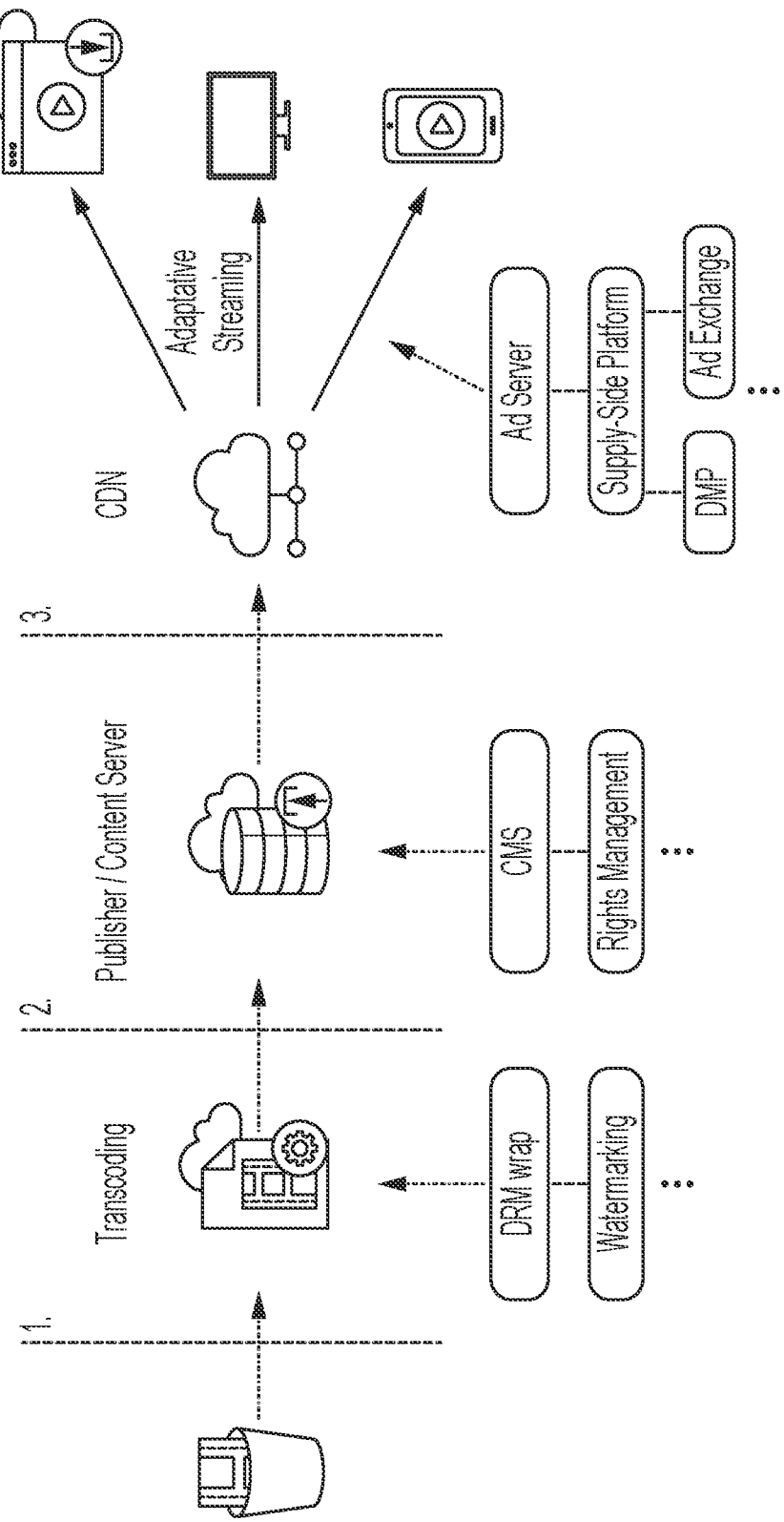
FIG. 1 is a diagram showing a typical content distribution model.
Figure 2:
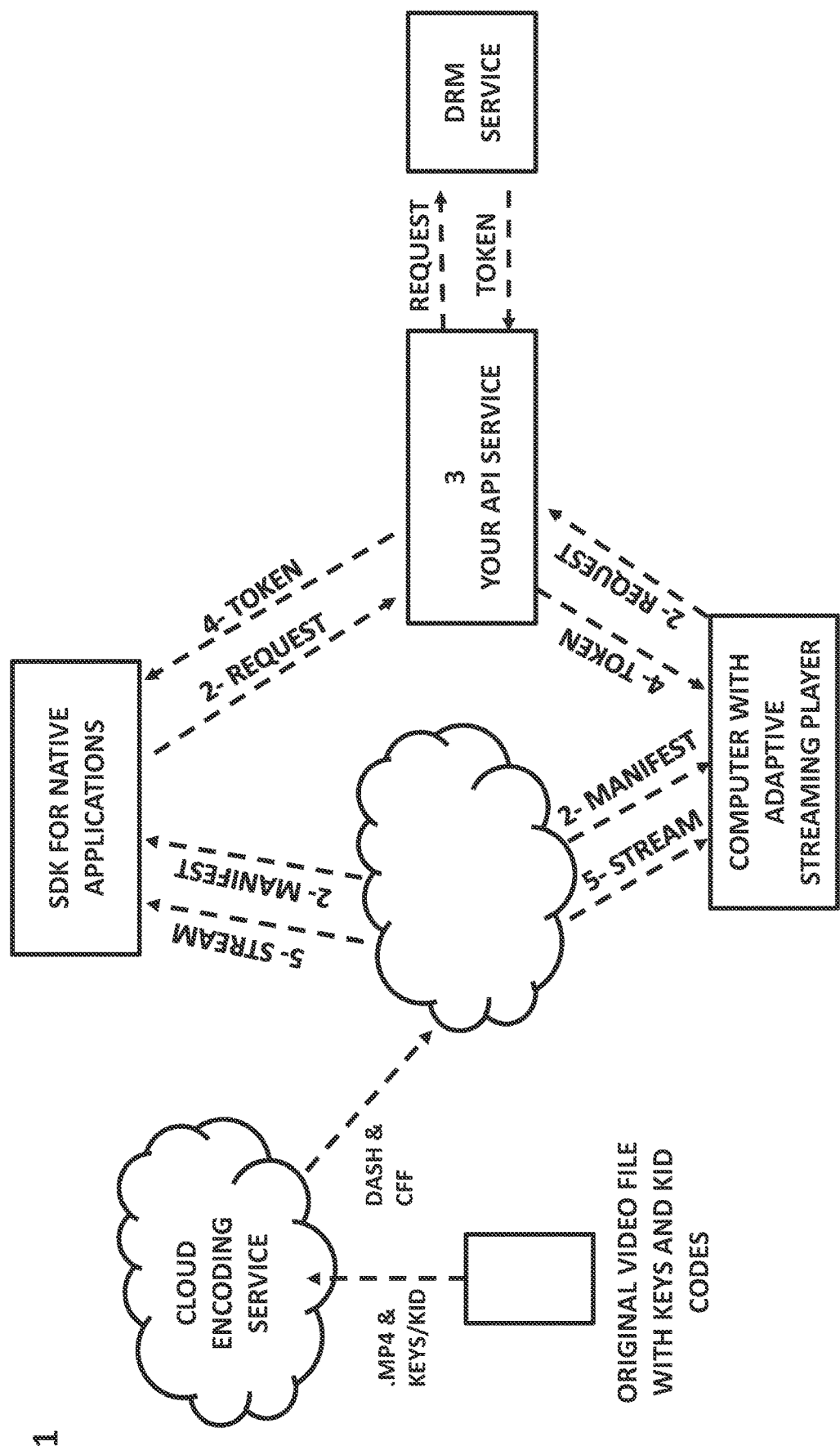
FIG. 2 illustrates a conventional DRM system and architecture.
Figure 3:
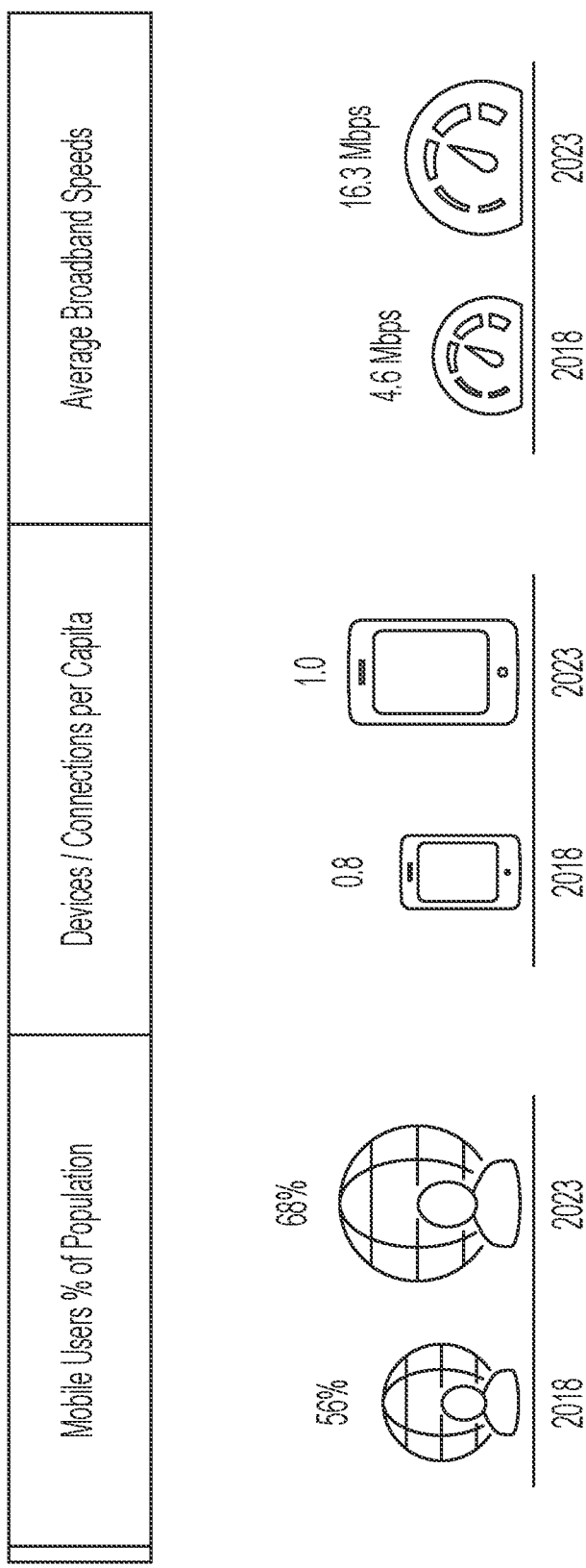
FIG. 3 illustrates the explosion of mobile data.
Figure 4:
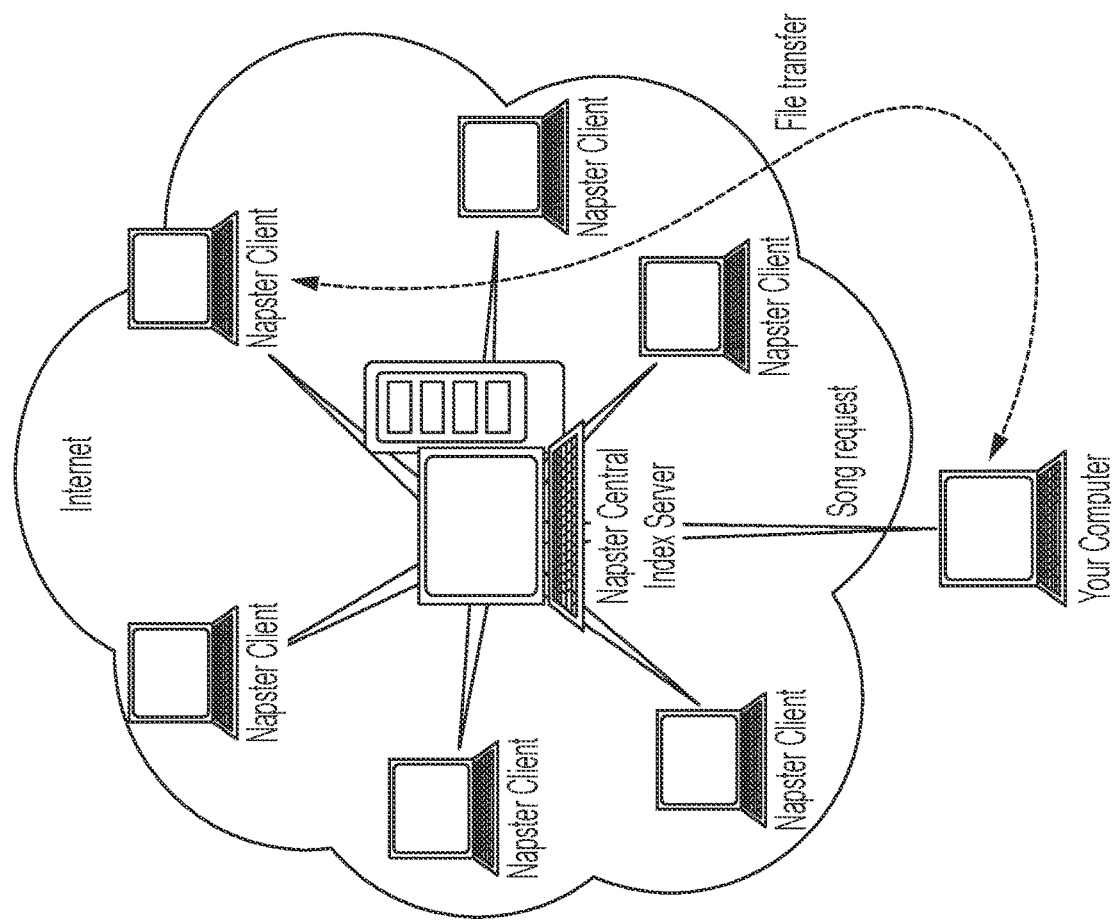
FIG. 4 illustrates the known Napster architecture.
Figure 5:
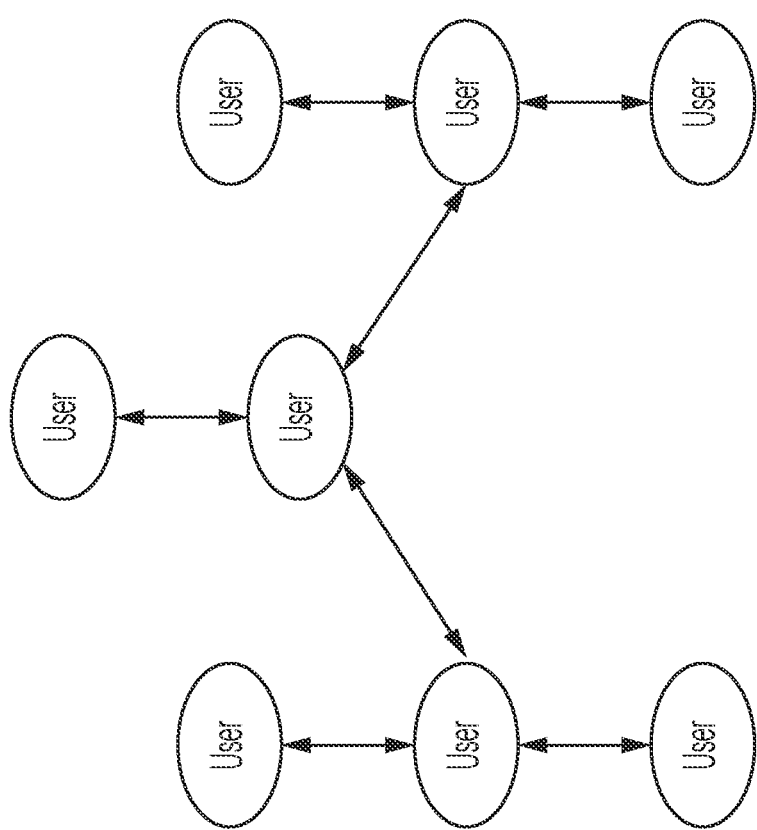
FIG. 5 illustrates a known Gnutella P2P network.

The disclosure is particularly applicable to a P2P encrypted data transfer system implemented in a CDN having edge servers and it is in this context that the disclosure will be described. It will be appreciated, however, that the P2P encrypted data transfer system and method has greater utility, such as to be used in any system in which it is desirable to provide secure encrypted mobile data transfer using a peer to peer architecture. Furthermore, the system may be implemented without a CDN system and may be used with any secured asset in which a secured music or other file example is used below for illustration purposes. The piece of content may be an audio, video or image file, but may also be a PDF format file, an executable (such as EXE) format file, an archive (such as TAR) format file and the like as the system and method are applicable to various file types.

Before a user can share secured asset content via a P2P file-sharing system and method, the content must be encapsulated by a dedicated Server using DRM rights and encryption or encoding. Non-encapsulated content is prevented from being sent between peers by a capsule control 601 (preferably a computer system with a processor and a plurality of lines of computer code/instructions that implement the capsule control) that is part of the elements 602-606 shown in FIG. 6A. Once any capsule is downloaded by any peer 608A or 608B in FIG. 6A), a server/SDK located in the system is automatically queried about the usage conditions and usage rights. As shown in FIG. 6B, each peer computer may have a processor 620 and memory 622 that houses various apps/modules that are each made of a plurality of lines of computer code/instructions that are executed by the processor 620 so that the peer computer or processor is configured to perform certain actions or caused to perform certain actions. Each peer computer 608A, 608B may have an application 622 executing on the processor 620 of each peer 608AS, 608B that may have a DRM Player 624 is capable of playing plain and DRM encrypted digital content, including video files, image and/or audio. The application 622 can acquire encrypted content via a Server 604 (shown in FIG. 6A) and request and receive the licenses from a content and license server 606. Every time a license expires, the DRM Player 624 executing on the peer computer 608A, 608B asks whether the user wants to renew the license via Edge or Cloud or Public Cloud such as by using the CDN system resources in FIG. 7. The content server 604 possesses a list of all content that it provides. The server 604, 606 may be capable of encrypting the content, creating a license for the encrypted content, and sending the encrypted content as well as the license to the user. A DRM agent 628 in an software development kit (SDK) 626 of the application 622 executing on each peer 608A, 608B acts as a controller and bridge between the DRM player 624 and the content and license server 604, 606. The DRM agent 624 handles license, content list, and media package requests, and is also responsible for managing keys as well as decrypting the media content received along with the license. Also, the DRM agent 624 manages all functionality in the client-side related to licenses such as supervision of usage rights.

Figure 6A:
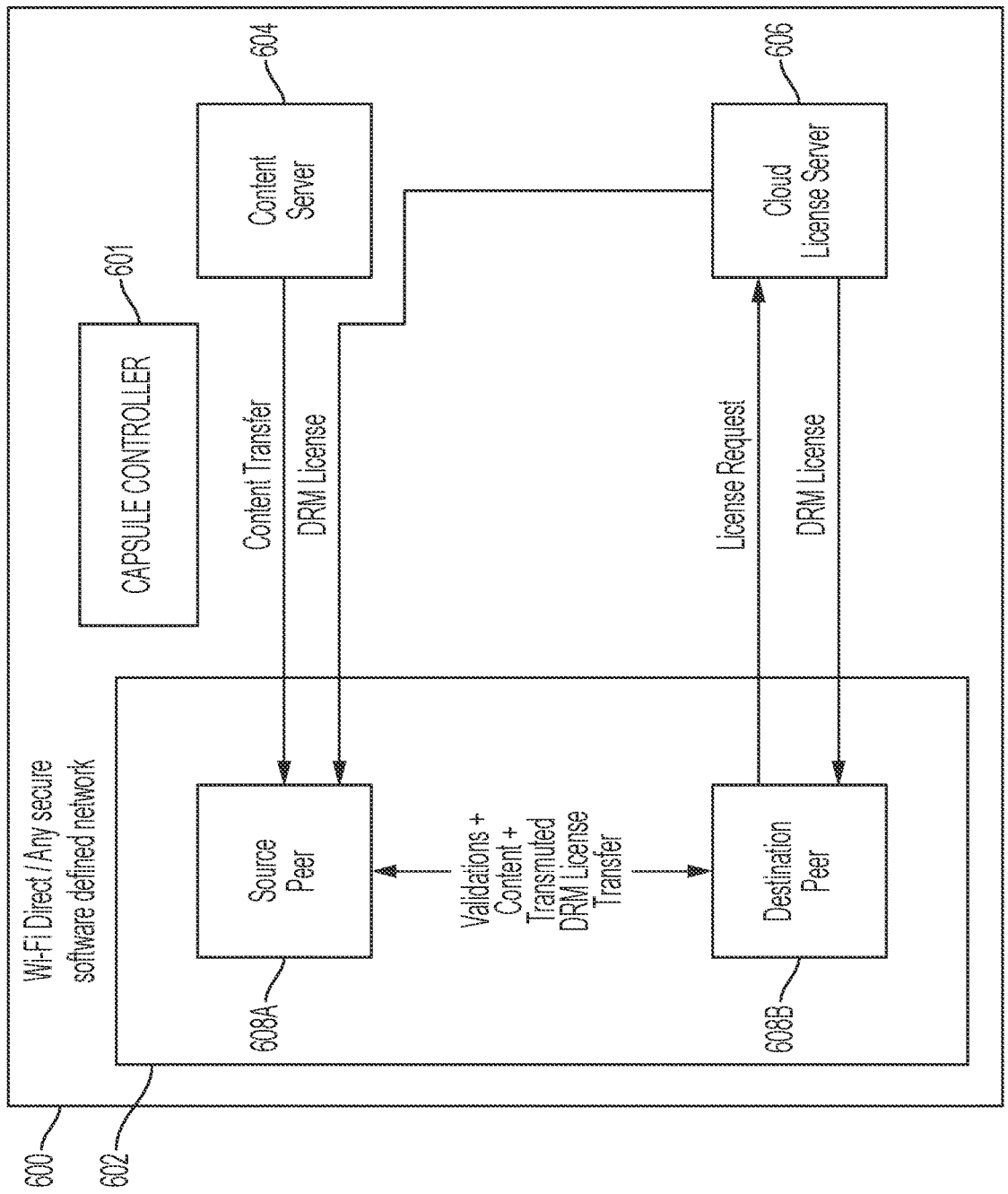
FIG. 6A illustrates an example of an implementation of a P2P encrypted data transfer system.
Figure 6B:
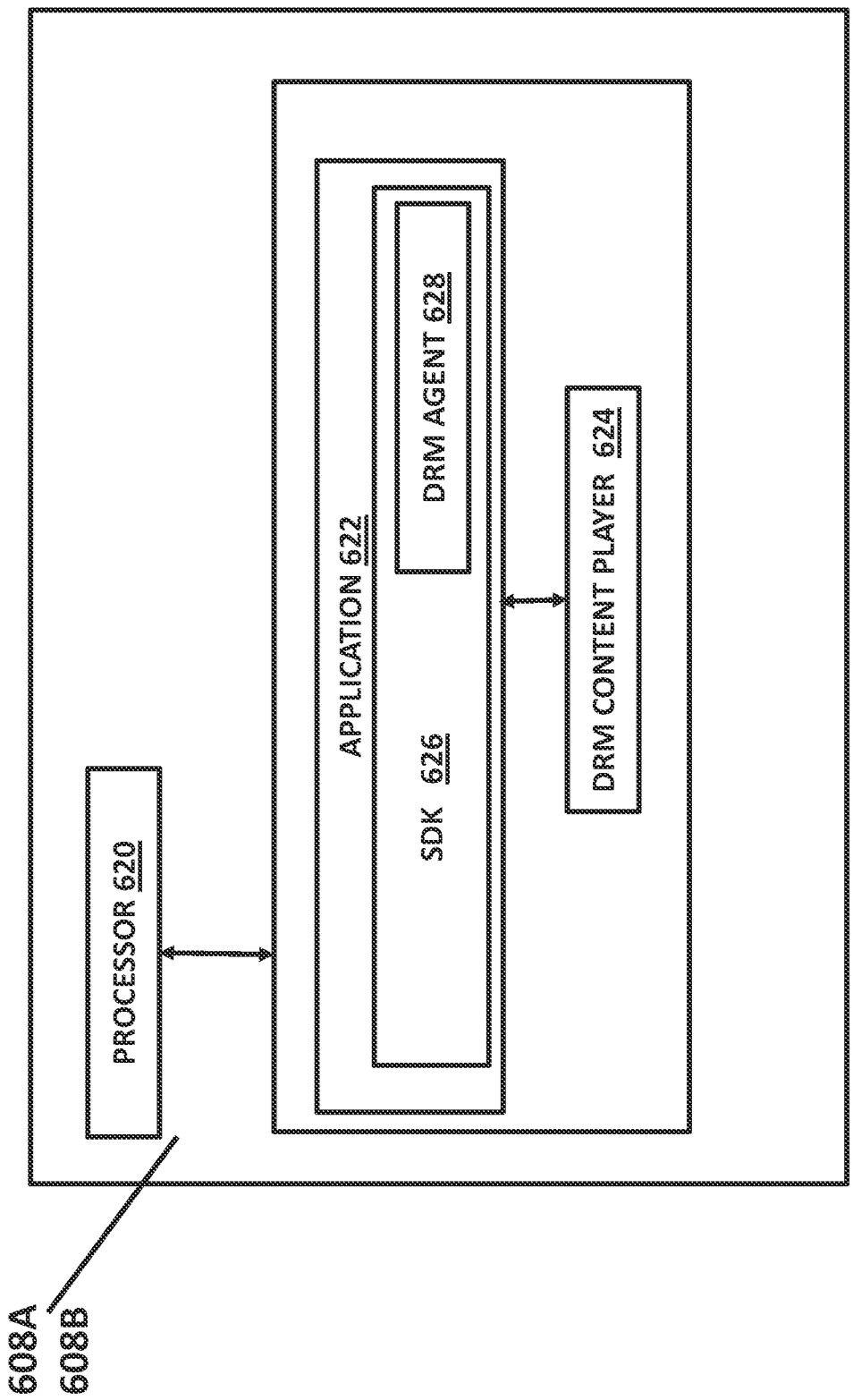
FIG. 6B illustrates more details of each peer computer system shown in FIG. 6A.

FIG. 6A illustrates an example of an implementation of a P2P encrypted data transfer system that may include a secure software defined delivery network 602 that is coupled to one or more content servers 604 and one or more content license servers 606. As shown in FIG. 6, the secured/DRM licensed content may be licensed from the cloud license server 606 to the secure software defined delivery network 602 so that one or more peer computers, such as a source peer computer 608A and one or more destination peer computers 608B, of the secure software defined delivery network 602 can secured and legally share the DRM licensed digital content by exchanging/communicating validations, the content and/or a transmuted DRM license transfer as shown in FIG. 6. Each of the elements 62-608B shown in FIG. 6 may be computer system have at least one processor and memory and a plurality of lines of computer code/instructions that may be executed by the processor so that the particular element is configured to perform the processes discussed below.

In one example, each of the source peer 608A and destination peer 68B operations may be implemented as an application running on a user's computing device (smartphone, mobile device, personal computer, laptop, tablet, etc.) that has a plurality of lines of computer code/instructions executed by a processor of the user's computing device so that the user's computing device/processor are configured to perform the operations of the source peer and/or destination peer. Also note that the term "server" or "peer" is simply a name designating the function of each element, but that each element may be more generally the computer system described above. Also note that the digital content discussed herein may be any type of digital content including music, videos, audio, games, books and/or other digital content.

The one or more content servers 604 may each be at a location where the digital content is stored originally. The digital content, using a well-known streaming platform's front-end, can be downloaded to users' devices. Such content servers 604 could be any origin servers, web servers (file servers), or any CDN services being employed by content owners. Examples of these devices and content servers are provided below in FIG. 7. The one or more cloud license servers 606 may each be where an encrypted license is delivered from/to the user's device. Such a server/service can authenticate and authorize a user before returning a valid encrypted DRM license. Such a license is required for the user's device to be able to playback the encrypted digital content.

Each source peer 608A may be a computer or computing device (a user's mobile phone or smartphone, laptop, tablet, etc.) that contains the digital content as well as a valid DRM Content License that was provided by the cloud license server 606 as shown in FIG. 6A. The valid DRM Content License may be used to playback the content on the source peer 608A (that may be a device.) Such a license can also be used to hypothetically generate a license for destination peers 608B—which will ensure that the destination peers 608B can at the least view the content once since the only thing they lack is a valid Internet connection, but have already subscribed to the OTT Video Streaming service.

Each source peer 608A can act as two things—a Content Server (similar to the content server 604) and a License Server (similar to the License server 606). Each source peer 608A has the business logic and capabilities to ensure that it can pass on valid playable Content and can transmute the Content License of the source peer 608A to one that can be used by peer device's content playback system to render the content for it as shown in FIG. 6A. Each source peer 608A can also look after enforcing certain business rules over the Content License transferred to the destination peer 608B (or device consuming the content from the destination peer 608B), such as License Expiry, hours/number of times the destination peer 608B can playback using the license, and where the peer 608B can further share this license or not, etc.

Each destination peer 608B may be a computing system, device, smartphone, laptop computer, etc. that receives the encrypted content from the source peer 608A. It's primary role is to furnish its own details to the source peer, for platform, subscription and other possible validations. Post validations, the destination peer 608B has to perform some straightforward state management such as progress indicators/calculations, checksum matching, etc, in order to ensure safe, secure and complete acquisition of the content & licenses. The received content and licenses can and will be used to render UI/UX to customers, for consumption. The destination peer 608B is also responsible for notifying the actual online API endpoints of the OTT Streaming Service, about the transactions and consumption which occurred when it was offline, whenever it comes online. It is up to the business logic implementation, as to whether to discard the local licenses and obtain a fresh licenses from the online API Endpoints of the service, or continue to use the local peer generated licenses till their validity as discussed below in more detail. As shown in FIG. 6A, each destination peer 608B may also request a license from the license server 606 and receive a DRM license from the license server 606.

The destination peer 608B may request a license added security. The source peer license may be generated offline (and may not have the updated logic). As a result, once the destination device gets access to the License server 606, it can request a fresh, updated license. In some examples, the updated license is not required but is optional. The source peer license would work in such examples but the update may be dependent on business logic and security requirements, which may differ from application to application.

Figure 7:
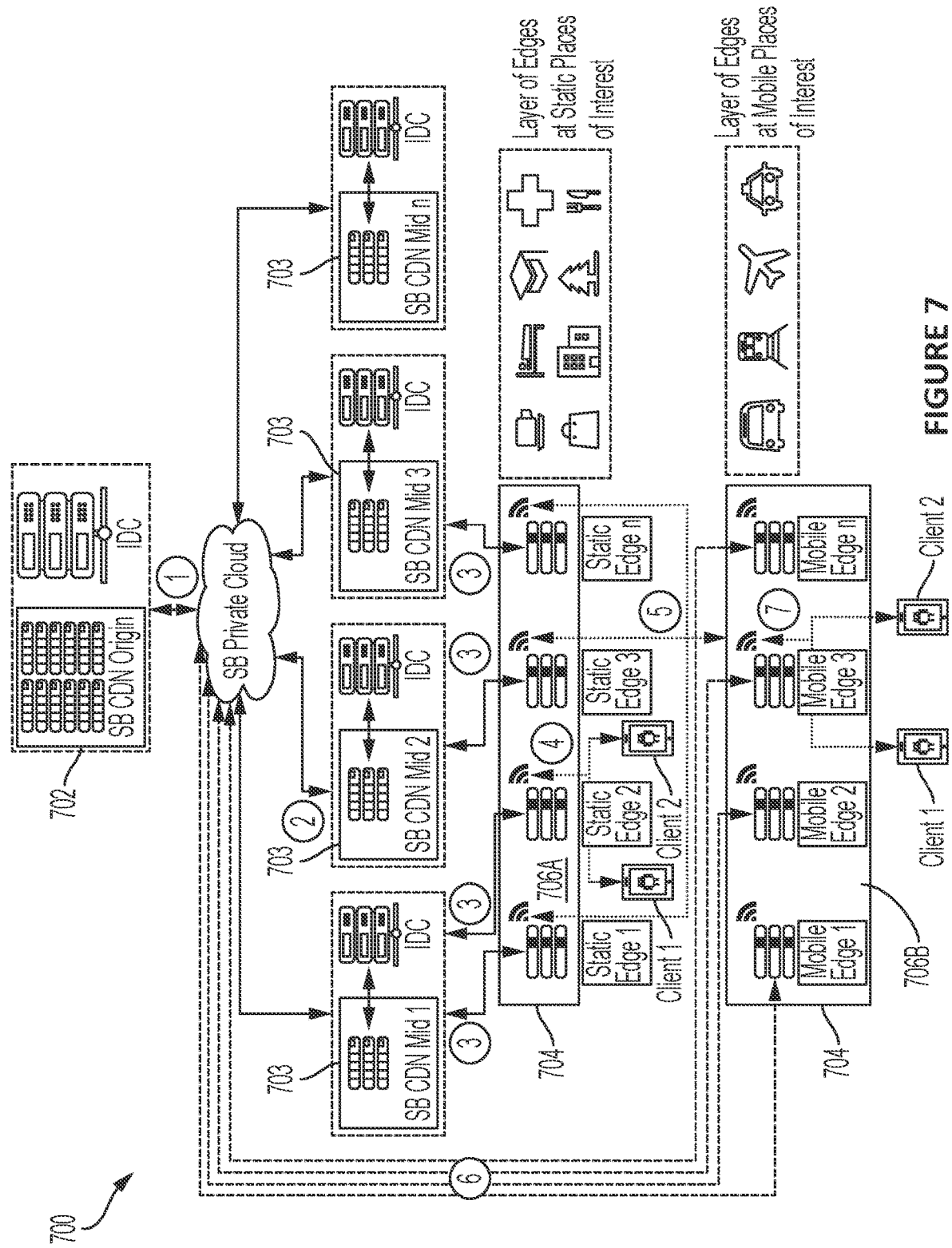
FIG. 7 illustrates an example of an implementation of a P2P encrypted data transfer system in a content delivery network with edge servers to which a mobile device connects using WiFi or other wireless connection.

FIG. 7 illustrates an example of an implementation of a P2P encrypted data transfer system in a content delivery network with edge servers 700 to which a mobile device connects using WiFi or other wireless connection. The CDN system 700 is a multi-tiered CDN architecture with a CDN Origin server 702 forming the first tier, the CDN mid servers 703 forming the second tier and the one or more edge servers 704 forming the third tier of the CDN system 700.

The Edge Servers 704 can be one of two types—a static edge server 706A or a mobile edge server 706B. The Static Edge server 706A has wired high speed connectivity to the CDN infrastructure 702-703. The Mobile Edge Server 706B does not have wired high speed connectivity to the CDN Infrastructure, but instead gets intermittent high speed connectivity to the CDN Infrastructure via a dedicated WiFi SSID at each Static Edge Server 706A and also gets intermittent connectivity to the Infrastructure (not necessarily high speed) using cellular data services offered by a telecom provider.

Unlike a regular CDN, which works on a pull based caching model, the CDN system 700 works on a hybrid pull and push based model. Furthermore, an Edge Server (Static & Mobile) 704 may be collocated at a Place of Interest (POI) which is characterized by a specific user demographic and Service access patterns. Based on the above, an Edge server 704 within the CDN 700 can be instructed to get a list of content that it needs to cache. Whenever the Edge server 704 has high speed connectivity to the CDN Infrastructure, the Edge Server 704 starts downloading content (including encrypted content) from the previous tier and updating internal data structures to indicate that the content has been downloaded, and also update various other telemetry information. As each Edge Server 704 starts serving data to users, the consumption data is fed to Machine learning algorithms to generate content lists based on the user demographics and Service access patterns at the Edge Server.

Each of the Edge server 704 also has a last mile over Wi-Fi, configured to cover the entire POI, which is used to serve content that is cached in the edge server 704 to the subscriber/client devices over the wireless connection where the client device may be a mobile computing device, a laptop computer, a tablet computer and the like.

The CDN edge servers 704 create a local network with self-contained DNS and DHCP services to enable the subscribers mobile devices to connect to the CDN system 700. For the P2P system, an Edge first mechanism creates a local area network (LAN) in which copyright-protected encrypted files can be legally transferred between peers. Edge servers are deployed to community premises to establish local WiFi networks. In this system, people within the premises/POI can connect their computing devices to the WiFi network to share digital rights management or DRM-protected files in which the computing devices can act as the source and destinations peers shown in FIGS. 6A and 6B. The DRM-supported P2P content transfer solution creates a legal P2P sharing ecosystem by enabling the audience to act as an authorized source of distribution for content providers. Using this system, viewers get better quality of experience (QoE) so that content providers watch quality of service parameters (QoS) improve, a partner architecture is better-prepared to handle spikes in viewership—P2P delivery offers real-time scale and the system reduces bandwidth costs to fetch the same content again.

Figure 8:
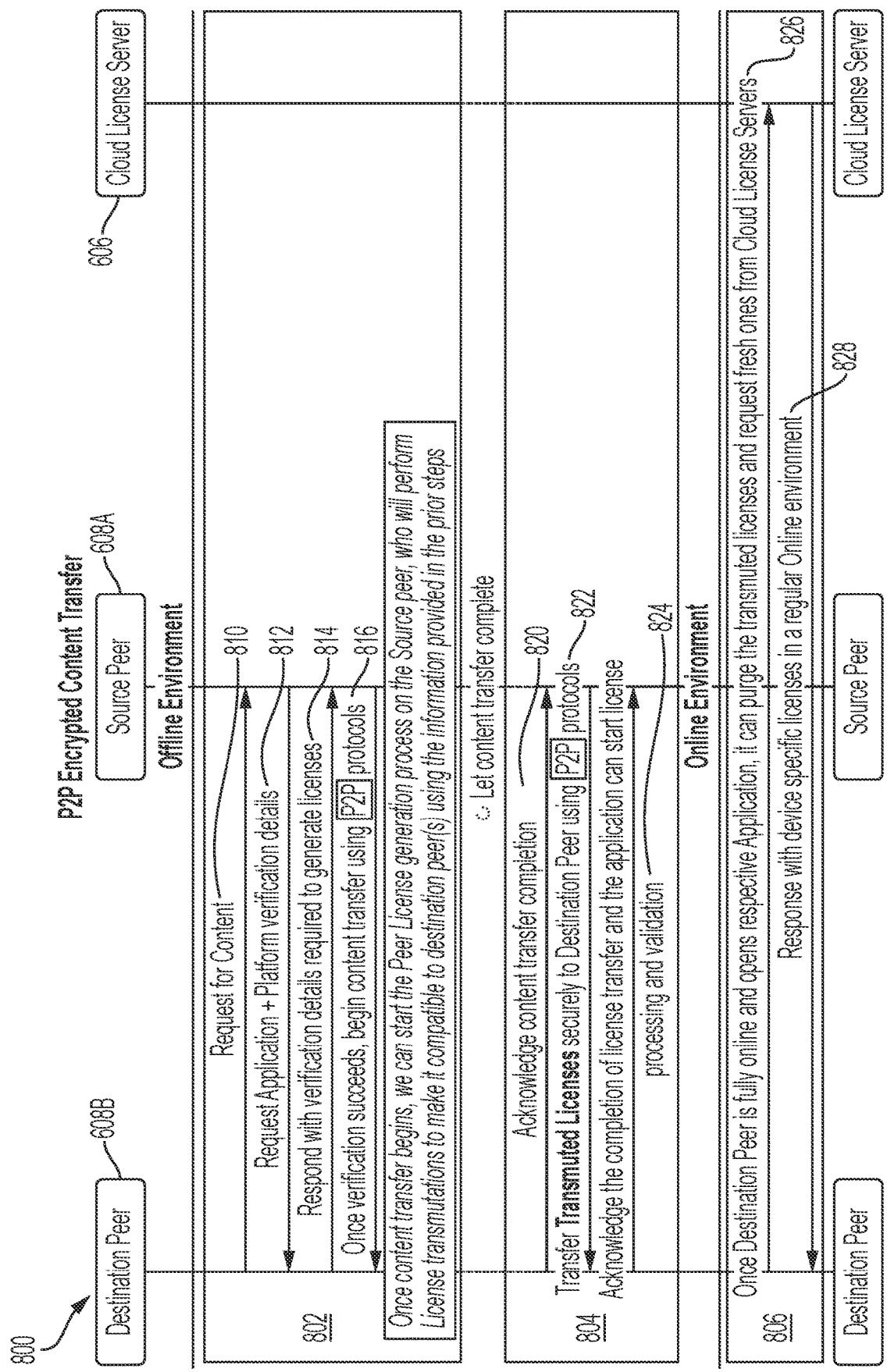
FIG. 8 illustrates a method for P2P encrypted data transfer.

FIG. 8 illustrates a method 800 for P2P encrypted data transfer between the destination peer 608B, the source peer 608A and the license server 606 as shown in FIG. 6A. This method may be performed using the system in FIG. 6A,6B or 7, but may also be implemented using other systems that can perform the processes shown in FIG. 8. For illustration purposes, it is presumed that the device/computing system that is the source peer 608A has acquired the licenses and other content-playback paraphernalia in the application framework, using the online Cloud License server 606, before the P2P-transfer process begins. The P2P encrypted data transfer process 800 works using either one or a combination of the following two methods discussed below. The method 800 may include an offline environment pre-content transfer process 802, an offline environment [post-content transfer process 804] and an online environment process 806 as shown in FIG. 8.

In the method 800, mobile platform-agnostic and time-bound licenses are generated to enable their storage and usage across mobile OSs like Android, iOS, Web, etc. within a stipulated period. These licenses can be transferred to other legitimate peers, based on a predefined set of rules. The content and licenses can be restricted to be accessible via the Application frameworks they were designed to run in only. In some examples, rules can be pre-defined at the Source peer level—around how many peers the Source can serve without getting connected, how many days the source can serve without getting connected, what geographies can the source serve licenses in, etc. Rules can also be pre-defined at the Destination peer level—around how many days can the Destination peer keep playing the licensed file without getting connected, how many playbacks can the Destination peer complete without getting connected, what geographies can the Destination peer playback the file, etc. In some examples, a combination of both pre-defined at a Source level and pre-defined at a Destination peer level can also be implemented. Once a Source peer validates the legitimacy of a Destination peer, the Source peer can generate a license, using license-generation algorithms. These algorithms are standard ones that can be embedded in our code to generate licenses that may be a plurality of lines of instructions/computer code executed by the device acting as the source peer 608A in the method 800.

The method 800 shall use a custom license sharing pipeline wherein once an encrypted content is shared via verified Application such as the method identifies the legitimacy of the client using built-in Android Platform+iOS Platform+proprietary Application specific validations. Here, OS specific APIs will be used to establish the peer to peer connection, so the authenticity of client and connection is already verified, additional logic to verify more checks as per business requirements would be employed by custom server and client code in the proprietary app.

Upon successful authentication, the method 800 runs procedures having known algorithms that can transmute existing licenses issued to the Source peer for making them compatible with the Destination peer(s) 606B. All of the above processes may be carried out on the source device 608A and is not dependent on Internet connectivity or access to the actual Licensing or Application server 606 in the Cloud. When the app on the destination peer 608B is reopened on the device at a time when Internet connection is available (an online environment process 606)—the transmuted licenses can be purged, and fresh licenses can be issued from the Cloud on behalf of the Destination peer(s) 608B.

Thus, as an example, using the P2P Encrypted data transfer technique 800, User A will be able to transfer File C to User B over a local Wi-Fi network or using the device hotspot functionality. The App on User B's device will be able to list File C in the Downloads section of the App and User B will be able to play File C on his device, all without requiring internet access. In addition to this, the Netflix App on User B's device will also be able to list and stream File C (without transferring it to User B's device) from User A's device over a local Wi-Fi network or using the device hotspot functionality on User A's device.

The offline environment pre-content transfer process 802 may include a request for content 810 from the destination peer 608B to the source peer 608A that has the licenses for the digital content to be shared with the destination peer 608B. In response to the content request, the source peer 608A may request content application (particular type of media player) and platform (iOS, Android, etc.) verification details 812 from the destination peer 608B. The destination peer 608B may send the verification details that may be used to generate the digital content licenses 814. These are the standard Media player and OS defined verifications processes that need to be completed for data transfer and playback to be carried out.

Authenticated User

A user's onboarding on the P2P-file transfer ecosystem described above begins (816) once the user is authenticated via one-time password (OTP) or if the user is pre-authenticated by the Partner app Pre-authentication via Partner app is subject to submission of verified user details, like name, mobile number, and email address. Once the content transfer begins, the system may start the Peer License generation process on the source peer which will perform license transmutations to make it compatible to destinations peers using the information from the prior steps 818. The destination peer 608B may then acknowledge content transfer complete 820. The Source peer may then transfer transmutated licenses securely to the destination application and start license processing and validation 822. The destination peer may then acknowledge the completion of license transfer and the application can start license processing and validation 824. The mobile number authenticated by a Partner app acts as the primary identifier for the user in the ecosystem. All further payments-related information is mapped against the user using this mobile number/userID combination.

The online environment 806 may include the destination peer 608B communicating to the cloud license server 606 that once destination peer is fully online and opens respective applications, it can purge the transmuted licenses and request fresh ones from cloud license servers (826). Then the cloud license server 606 may respond with the device specifics in a regular online environment 828.

User Rights Expression Model

Figure 9:
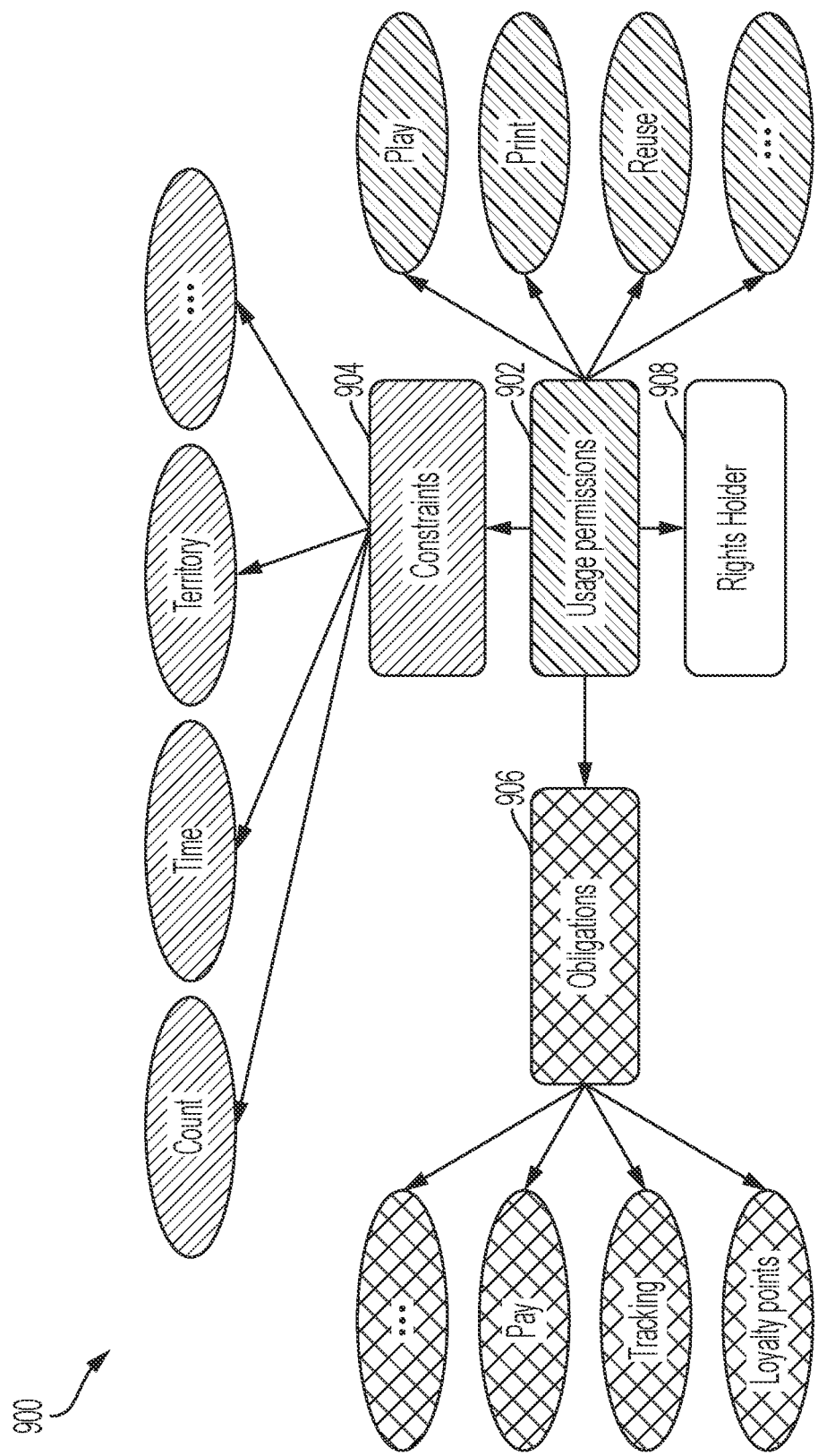
FIG. 9 illustrates an example of a user rights expression model.

The P2P system and method for encrypted data transfer may have a user rights expression model that defines the rights of each user. FIG. 9 illustrates an example of a user rights expression model 900. From the point of view of a common user, who is accustomed to free P2P downloading from pirated sites, the DRM technology is an alien and not an attractive proposition and the potential for micro-level control of customer usage may be resentful for customers accustomed to a broader range of liberty in terms of usage as offered by analog technology. If a user buys a digital piece of content, he or she may well expect to play it on any device that he or she has. However, the content provider who's allowing reasonable usage rights may exploit versioning to set individual prices for each of the various usage scenarios. The standard license only includes limited rights to play the media content, but a more personalized set of rights should offer, for instance, rights for storage, print, and resale of the content. As shown in FIG. 9, the rights expressions for each piece of digital content may be divided into permissions 902, constraints 904, obligations 906, and rights holders 908 with the relationships shown. As shown in FIG. 9, the permissions 902 may include one or more of a permission to play the digital content, a permission to print the digital content, a permission to reuse the digital content, or other permissions alone or in any combination, etc. The constraints 904 may include a count (a number of times that the piece of digital content may be played), a time (a time period during which the digital content may be played), a territory in which the digital content may be played, or other constraints alone or in any combination, etc. The obligations 906 may include a pay obligation, a tracking obligation, a loyalty points obligation, or any other obligation alone or in any combination, etc.

The realization of the scheme in FIG. 9 may require flexible tools for licensing and payment processes. Content Partners should configure each content with relevant sharing rights so to enable P2P sharing for Partners. These configurations can be done on Cloud and then redistributed to live Edge servers 704 as shown in FIG. 7 so to enable the same.

Rights Negotiation System

Figure 10:
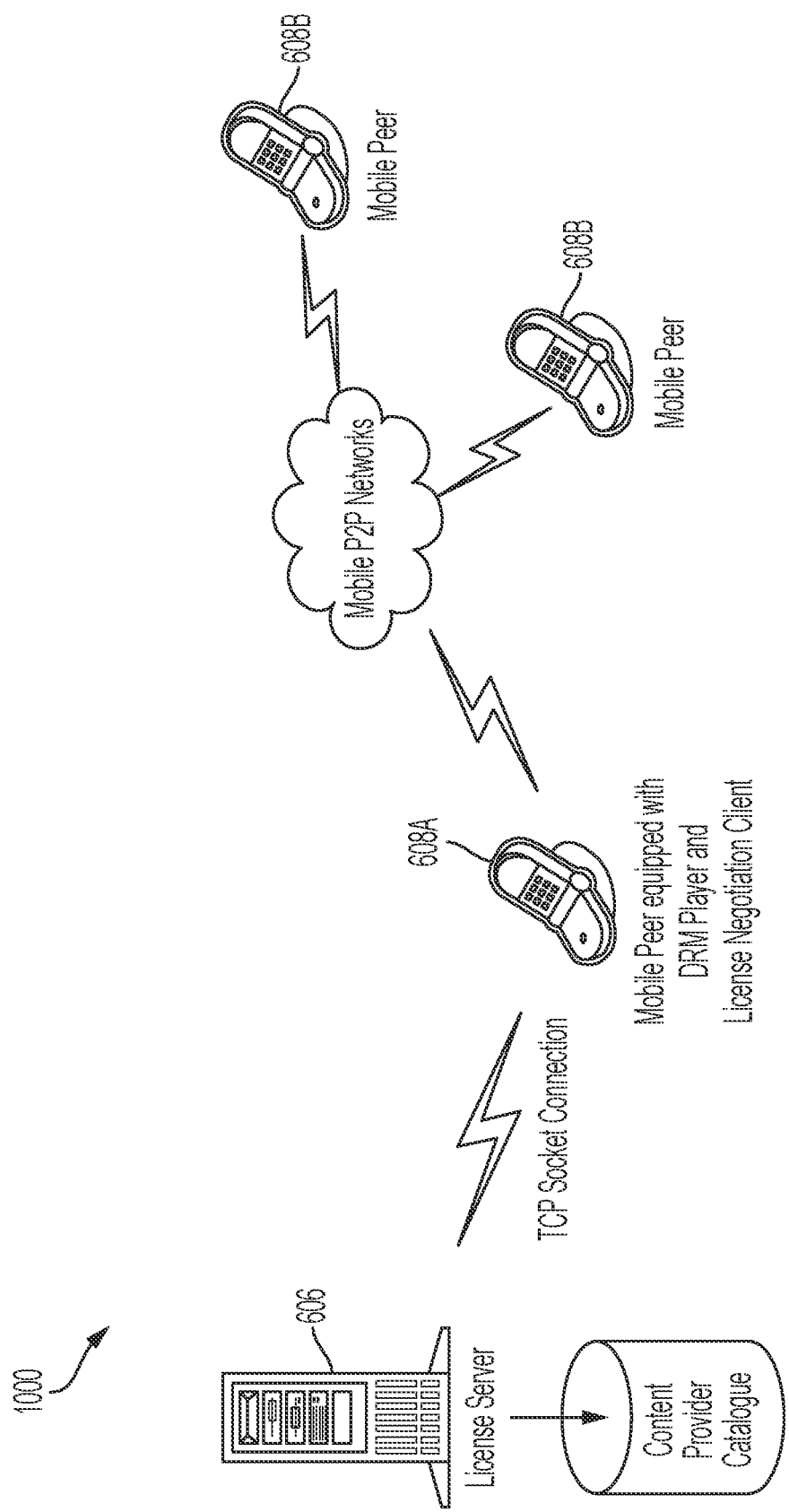
FIG. 10 illustrates an example of a rights negotiation process that is part of the system.

FIG. 10 illustrates an example of a rights negotiation process that is part of the system between the license server 606 (that has access to a content provider catalog of digital content), the source peer 608A and one or more destination peers 608B. In one embodiment in which the P2P system is part of a CDN (example of which is shown in FIG. 7), the rights negotiation system (a plurality of lines of computer code/instructions executed by a processor) may be host on the edge 704 wherein the processor and edge 704 perform the rights negotiation process. As shown in FIG. 10, the source peer 608A may include the DRM player (discussed above) and a license negotiation client that is a plurality of lines of computer code/instructions executed by a processor of the source peer 608A to configure the source peer 608A to perform the license negotiation process for a particular piece of digital content.

The Rights Negotiation System consists of two applications: a client Software Development Kit (SDK) (executed by the source peer 608A and part of the license negotiation client) and a server (the license server 606 in FIG. 10). The client enables users to create request profiles, which contain the information related to the desired license characteristics for a particular piece of digital content. The server maintains a catalog of the known content providers as shown in FIG. 10.

In some examples, the client application (for the license negotiations) runs on the user's mobile phone along with the installed Client Application, being equipped with the SDK. The Partner Application may be the same app as the client app, for example just another customer using the app, which may mean a Content Provider App.

The user journey may begin with the user retrieving DRM-content that requires licensing and the particular digital content may be stored in his application on the computing device. The system may allow the user to choose whether he or she wants to negotiate a license for the content and share the digital content and license with peers. Depending upon the User's choice, along with the content, the SDK may share the User' profile and negotiation parameters to the server.

The license negotiation server (that may be the license server 606 in one embodiment) may include a server application (a plurality of lines of computer code/instructions executed by a processor of the server) that contains the logic required for the negotiation process. It is mainly responsible for processing the incoming-request profiles as well as for maintaining a catalog of available content providers. The server application must be able to interpret request profiles and form a set of rules for content-transfer that is specific to the user receiving the content.

For example, to start, in the beginning a mechanism may be established which identifies both parties' current session and transfer requests uniquely. Rules may be established such as, but not limited to, no transferring of content that is restricted to certain geographies, or with a certain parental rating, etc.

For example, an over-the-top (OTT) application at the backend level can specify different logic for source mode and destination mode of their mobile application. Sample limitations/rules can be set such as:

1. Offline P2P transfer to a maximum of 50 clients per disconnected session and/or distribution restricted to only 7 days—post which the client will mandatorily need to connect to the OTT Backend.

2. In destination mode—a limitation can be placed on the number of views and/or the duration of the views can be set. For example—a limitation to be able to consume offline transferred content up to 2 times or for a max of 2 days.

The server may generate an offer profile that is returned to the client and the returned offer-profiles must match the received request profile. Content providers are also required to return their offer-profiles within a determined time interval. The recipient user shall then receive and use the content as per the agreed Rights/Licenses. The validation of the appropriate use of the content may occur, in the CDN embodiment in FIG. 7, on the Edge server 704 or cloud.

USE CASE EXAMPLE

The above P2P encrypted data transfer process and system may be used in the following manner between two users, User A and User B. The scenario for the use case is that the two users are travelling via a two hour flight from City A to City B. Both users have an active over the top (OTT) Video Streaming subscription which allows the user to stream content without any playback restrictions (similar to most of the current market incumbents). In this example, User B forgot to download a movie before getting onto the flight, and now have no internet to view/download the same, but, User B on the other hand has a bunch of movies lying around on his OTT Video Streaming Application, which he is currently consuming as well.

The P2P encrypted data transfer process allows a user to consume the same content that you technically are also eligible to consume, but forgot/missed out on downloading due to some reason or the other. The P2P encrypted data transfer process is able to facilitate this while maintaining the content DRM protection since the Content Licenses are only available for use by the holder of the content, but the P2P Encrypted Data Transfer process overcomes this technical problem with current DRM systems as described above. When an offline P2P encrypted data transfer activity is requested, at the beginning itself, security protocols and identity management is setup—which uniquely and securely identifies both the parties, ensuring that they can exchange subscription details, which will enable the source peer in making decisions regarding whether the requested content is transferrable or not. The source peer will try to figure out the entitlements of the destination peer—using the subscription details and do decision making as to the type of content allowed to play over the level of subscription the destination peer holds, regional restrictions, et al.

Using the P2P System and the encrypted data transfer method, a User device (Receiving device that acts as a destination peer) will be able to access (equivalent to a stream for a video) an encrypted file using any local data transfer protocol (local Wi-Fi/Bluetooth/NFC/others) from another user device (Transmitting device acting as a source peer) and the Receiving device will be able to utilize the file using the corresponding Application or service to which the file belongs. In another embodiment, a user device (Receiving device that acts as the destination peer) will be able to transfer (equivalent to a download for a video) an encrypted file using any local data transfer protocol (local Wi-Fi/Bluetooth/NFC/others) from another user device (Transmitting device acting as a source peer) and the Receiving device will be able to utilize the file using the corresponding Application or service to which the file belong. Both of the above can be accomplished even when both the user devices have internet connectivity, either of the two devices have internet connectivity or neither of the two devices have internet connectivity.

Example Computer Device

Figure 11:
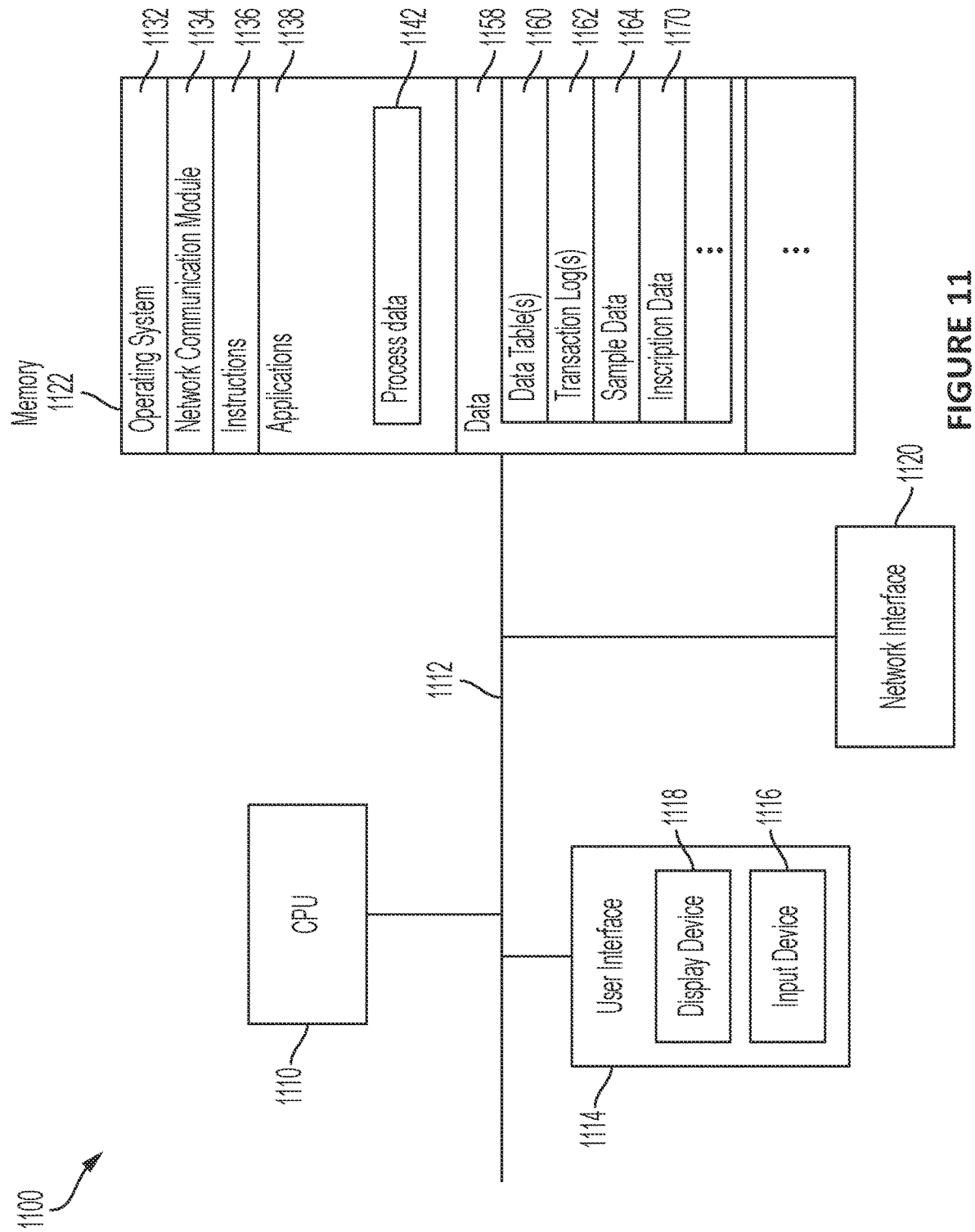
FIG. 11 illustrates an example computer system for the systems and methods described herein.

FIG. 11 shows an example computing device 1100 which may be used in the systems and methods described herein.

The example computing device 1100 may be used for each peer computer shown in FIG. 6 and the elements of the CDN in FIG. 7 and/or the devices in FIG. 10. In the example computer 1100 has a CPU or processor 1110 is in communication by a bus or other communication 1112 with a user interface 1114. The user interface includes an example input device such as a keyboard, mouse, touchscreen, button, joystick, or other user input device(s). The user interface 1114 also includes a display device 1118 such as a screen. The computing device 1100 shown in FIG. 11 also includes a network interface 1120 which is in communication with the CPU 1110 and other components. The network interface 1120 may allow the computing device 1100 to communicate with other computers, databases, networks, user devices, or any other computing capable devices. In some examples, additionally or alternatively, the method of communication may be through WIFI, cellular, Bluetooth Low Energy, wired communication, or any other kind of communication. In some examples, additionally or alternatively, the example computing device 1100 includes peripherals also in communication with the processor 1110. In some examples, additionally or alternatively, peripherals include stage motors such as electric servo and/or stepper motors used for moving the probe up and down. In some example computing device 1100 a memory 1122 is part of the computing device and is in communication with the processor 1110. In some examples, additionally or alternatively, this memory 1122 may include instructions to execute software such as an operating system 1132, network communications module 1134, other instructions 1136, applications 1138, applications to process data 1142, data storage 1158, data such as data tables 1160, transaction logs 1162, sample data 1164, sample location data 1170 or any other kind of data. Alternatively, some elements of the Figures above may be implemented using cloud components that may be hosted by a cloud computer like Amazon AWS.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
   a source computer having a processor and a plurality of lines executed by the processor so that the source computer is configured to retain a piece of encrypted digital content having a digital rights management (DRM) license; and
   a destination computer having a processor and a plurality of lines executed by the processor so that the destination computer is configured to:
   when the destination computer is offline and not connected to a license system:
     receive, from the source computer using a local data transfer protocol, the piece of encrypted digital content;
     receive, from the source computer, a transmuted license for the piece of encrypted digital content generated from the DRM license of the piece of encrypted digital content;
     decrypt, using the transmuted license, the piece of encrypted digital content; and
     consume the decrypted piece of digital content; and
   when the destination computer is connected to the license system:
     receive, from the source computer using a local data transfer protocol, the piece of encrypted digital content from the source computer; and
     request a license for the piece of encrypted digital content from the license system.

2. The system of claim 1, wherein the piece of encrypted digital content has a set of digital rights management (DRM) rights for a particular service and wherein the destination computer is further configured to decrypt the piece of encrypted digital content using the set of DRM rights and consume the decrypted piece of digital content using the set of DRM rights.

3. The system of claim 1, wherein the destination computer is further configured to access, using the local data transfer protocol, the piece of encrypted digital content.

4. The system of claim 1, wherein the destination computer is further configured to transfer, using the local data transfer protocol, the piece of encrypted digital content.

5. The system of claim 1, wherein the local data transfer protocol is one of WiFi, Bluetooth and near field communication.

6. The system of claim 1, wherein the piece of encrypted digital content is one of a video, an audio, an image, a PDF file, an executable file and an archive file.

7. The system of claim 1, wherein the destination computer is further configured to discard the transmuted license when the destination computer is connected to the license system.

8. A method, comprising:
retaining, on a first computing device, a piece of encrypted digital content having a digital rights management (DRM) license;
communicating, between the first computing device and a second computing device using a local data transfer protocol, about sharing an encrypted file containing the piece of encrypted digital content from the first computing device, wherein the communicating further comprises, when the second computing device is offline and not connected to a license system, receive, from the first computing device, a transmuted license for the piece of encrypted digital content generated from the DRM license of the piece of encrypted digital content and when the second computing device is connected to the license system requesting a license for the piece of encrypted digital content from the license system; and
consuming, on the second computing device having a service to which the encrypted piece of digital content belongs, wherein the second computing device decrypts and consumes the encrypted piece of digital content, wherein consuming of the encrypted piece of digital content further comprising decrypting when the second computing device is offline the encrypted piece of digital content using the transmuted license and consuming the decrypted piece of digital content and, when the second computing device is connected to the license system, decrypting the encrypted piece of digital content using the license from the license system and consuming the decrypted piece of digital content.

9. The method of claim 8, wherein the piece of encrypted digital content has a set of digital rights management (DRM) rights for a particular service and wherein the second computer decrypt the piece of encrypted digital content using the set of DRM rights and consumes the decrypted piece of digital content using the set of DRM rights.

10. The method of claim 8, wherein communicating about sharing the encrypted file further comprises accessing, by the second computing device using the local data transfer protocol, the encrypted file.

11. The method of claim 8, wherein communicating about sharing the encrypted file further comprises transferring, to the second computing device using the local data transfer protocol, the encrypted file.

12. The method of claim 8, wherein communicating about sharing the encrypted file further comprises one of communicating about sharing the encrypted file wherein each of the first and second computing device has an internet connection, communicating about sharing the encrypted file wherein one of the first and second computing device has internet connectivity and communicating about sharing the encrypted file wherein none of the first and second computing device has internet connectivity.

13. The method of claim 8, wherein the local data transfer protocol is one of WiFi, Bluetooth and near field communication.

14. The method of claim 8, wherein the piece of encrypted digital content is one of a video, an audio, an image, a PDF file, an executable file and an archive file.

15. The method of claim 8 further comprising discarding, by the second computing device, the transmuted license when the destination computer is connected to the license system.

* * * * *